(12) United States Patent
Schütt et al.

(10) Patent No.: US 6,648,397 B2
(45) Date of Patent: Nov. 18, 2003

(54) LOWERABLE MOTOR VEHICLE ROOF

(75) Inventors: Thomas Schütt, Fürstenfeldbruck (DE); Philipp Hutterer, Kiensau (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/943,735

(22) Filed: Sep. 4, 2001

(65) Prior Publication Data

US 2002/0074832 A1 Jun. 20, 2002

(30) Foreign Application Priority Data

Sep. 4, 2000 (DE) ............................ 100 43 703

(51) Int. Cl.[7] .................................................. B60J 7/08
(52) U.S. Cl. ............................ 296/107.16; 296/107.17; 296/107.18; 296/107.9; 296/107.2
(58) Field of Search ........................ 296/116, 107.07, 296/107.13, 107.16–107.2, 220.01, 218

(56) References Cited

U.S. PATENT DOCUMENTS

| | | | | |
|---|---|---|---|---|
| 2,141,842 A | * | 12/1938 | Lohrman | 296/107.17 |
| 2,210,590 A | * | 8/1940 | Jobst | 296/107.17 |
| 5,078,447 A | * | 1/1992 | Klein et al. | 296/107.2 |
| 5,558,388 A | * | 9/1996 | Furst et al. | 296/107.18 X |
| 5,975,620 A | * | 11/1999 | Jambor et al. | 296/108 |

FOREIGN PATENT DOCUMENTS

| | | | | |
|---|---|---|---|---|
| DE | 1013183 | * | 8/1957 | 296/107.17 |
| DE | 1117420 | * | 11/1961 | 296/107.17 |
| FR | 2696375 | * | 4/1994 | 296/107.17 |
| GB | 201652 | * | 8/1923 | 296/107.2 |
| GB | 223789 | * | 10/1924 | 296/107.17 |
| JP | 403204337 | * | 9/1991 | 296/218 |

OTHER PUBLICATIONS

Danzl et al., "Car Top—ein Cabrio–Verdecksystem von Webasto", p. 4, 1994, DE–Z:ATZ Automobiltechnische–Zeitschrift 96.

* cited by examiner

*Primary Examiner*—Dennis H. Pedder
(74) *Attorney, Agent, or Firm*—Nixon Peabody LLP; David S. Safran

(57) ABSTRACT

A Lowerable motor vehicle roof, with at least one openable front roof part (13) which is movably supported lengthwise on side roof members (8), and a rear roof part or rear element (7) which can be moved into the storage position in the body. The at least one front roof part (13) is located first in a storage space in the body (1) or on part of the roof (5) when the roof (5) is being lowered, and then the roof (5) is lowered into its storage position.

21 Claims, 41 Drawing Sheets

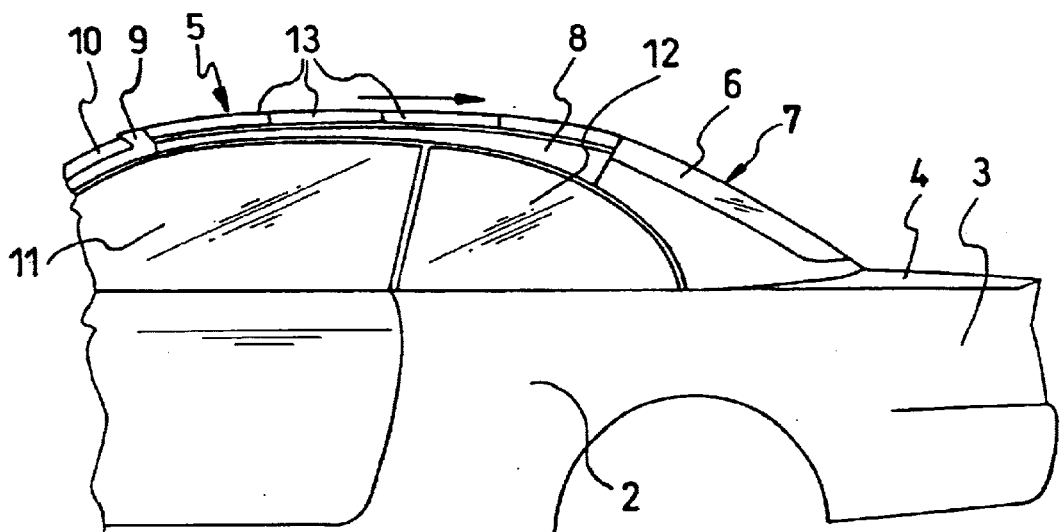
FIG. 1.1
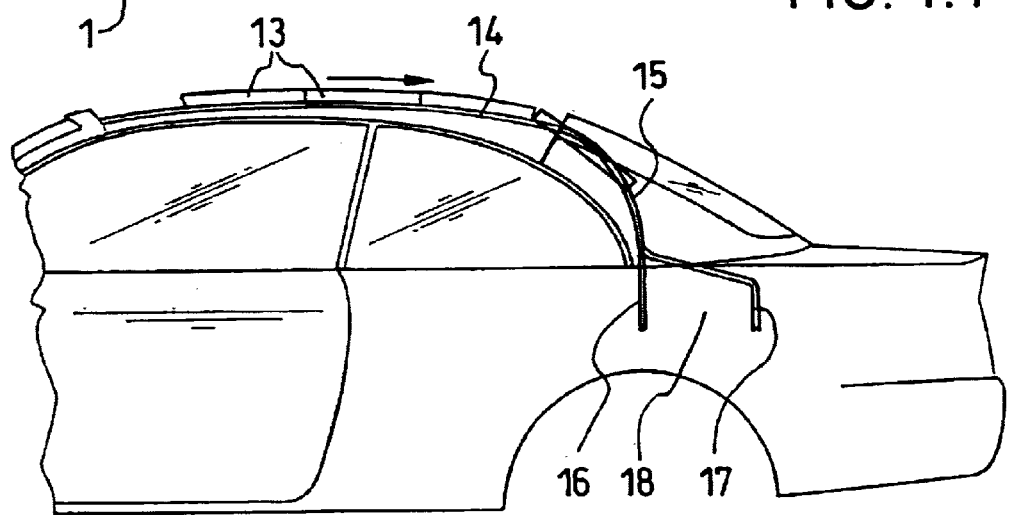
FIG. 1.2
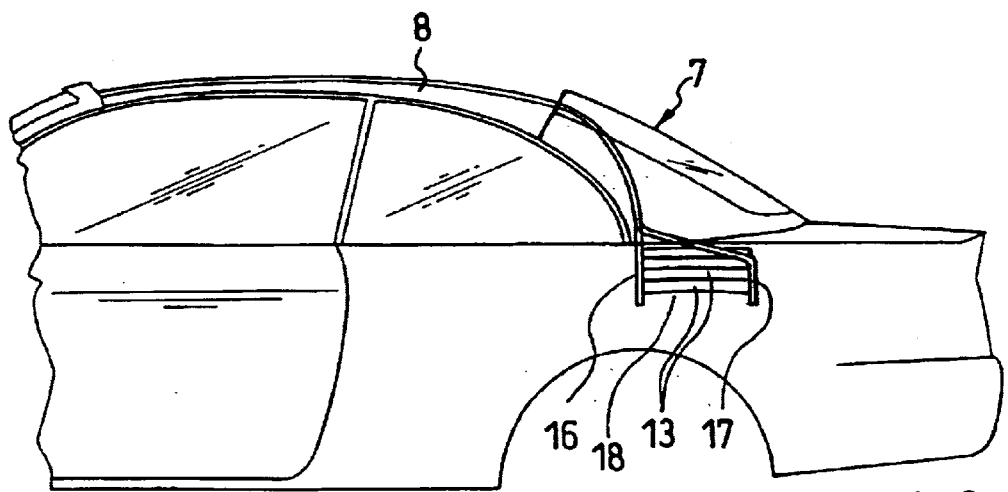
FIG. 1.3

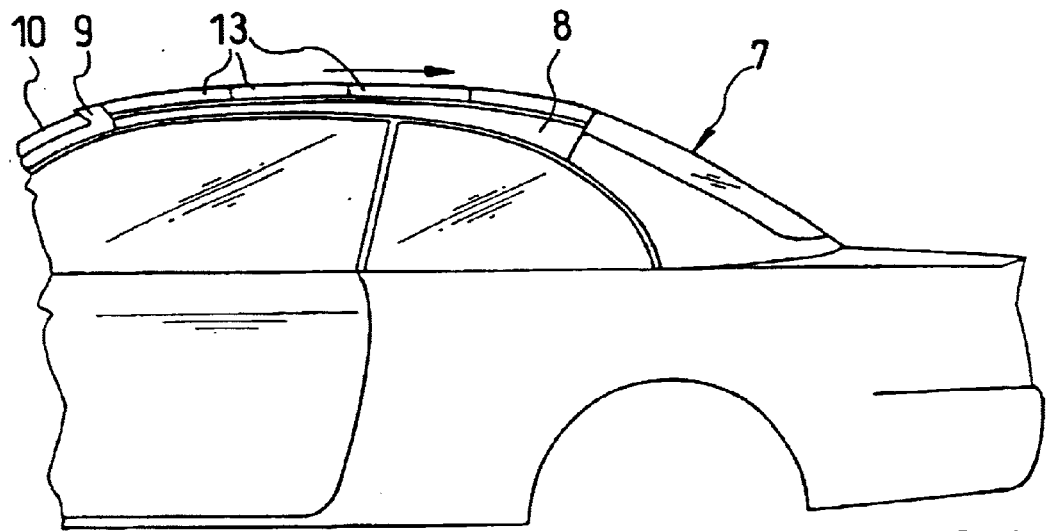
FIG. 3.1
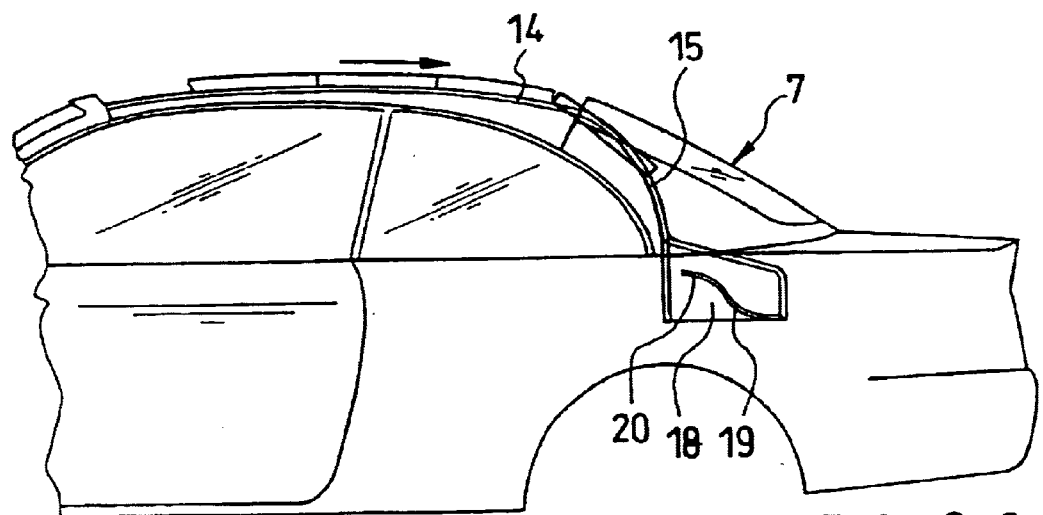
FIG. 3.2
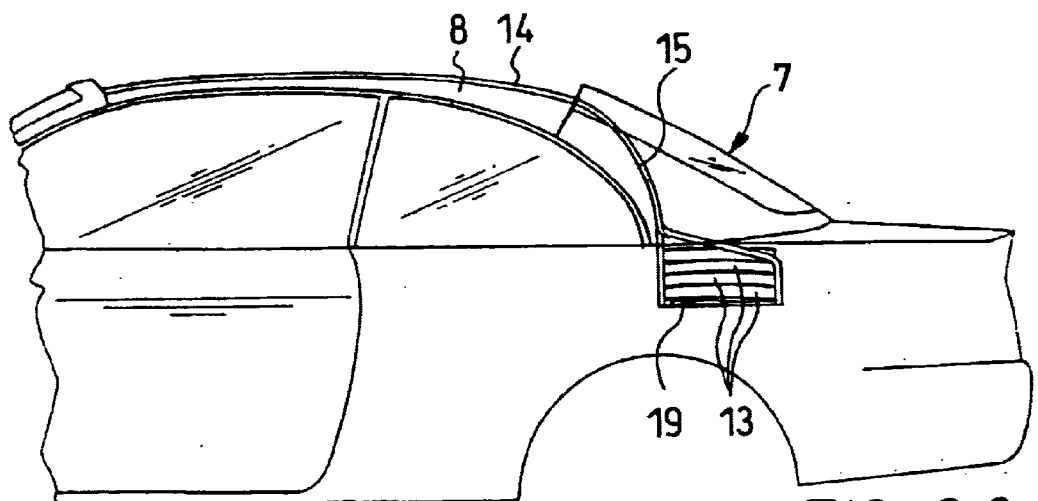
FIG. 3.3

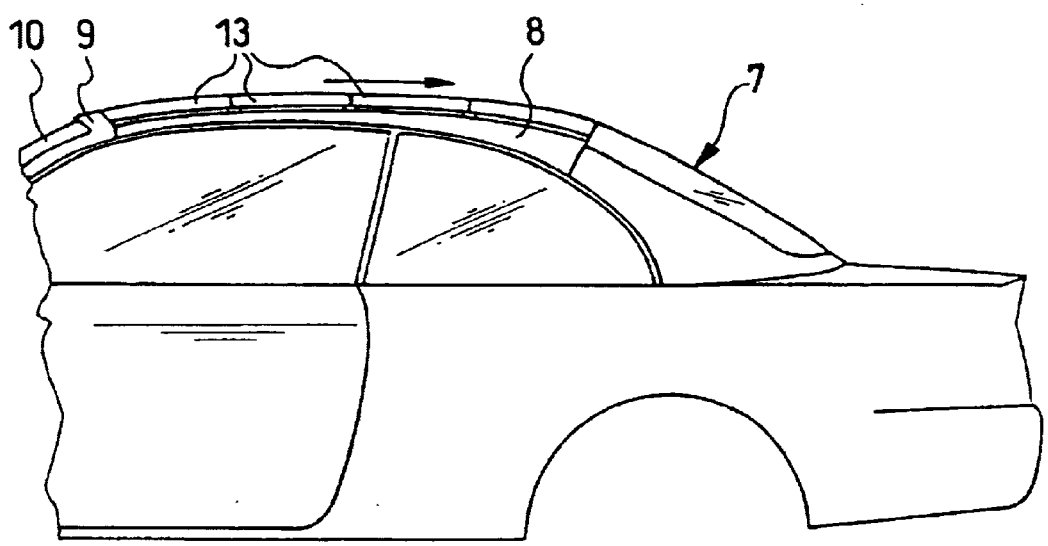
FIG. 4.1
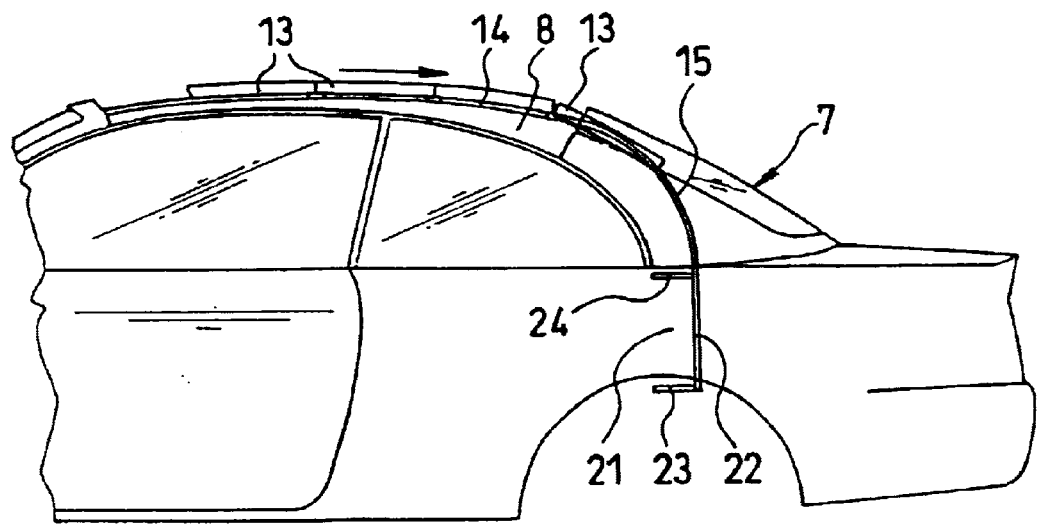
FIG. 4.2
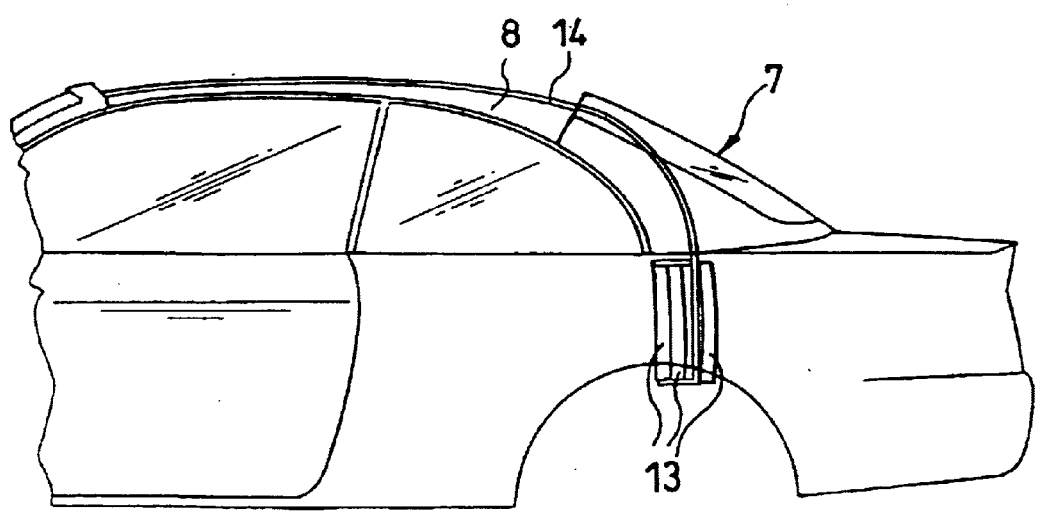
FIG. 4.3

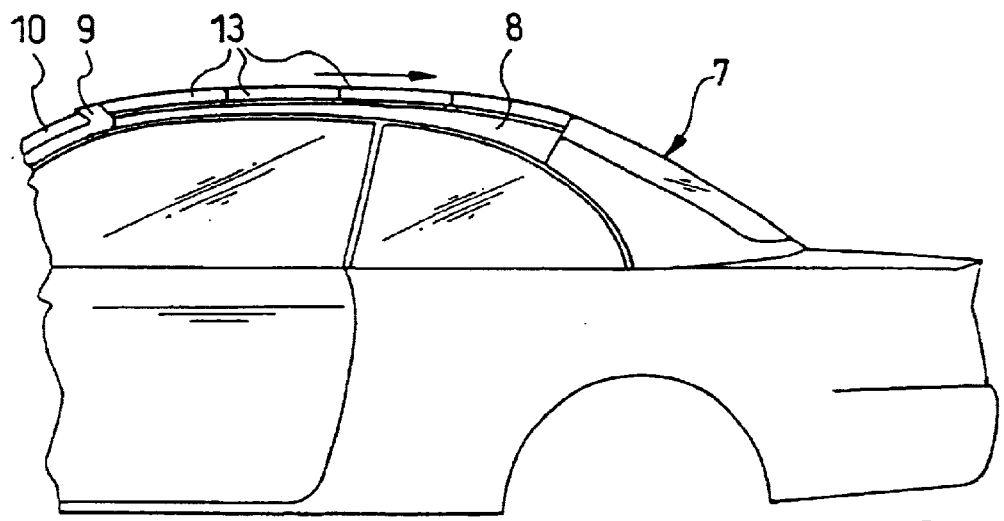
FIG. 5.1
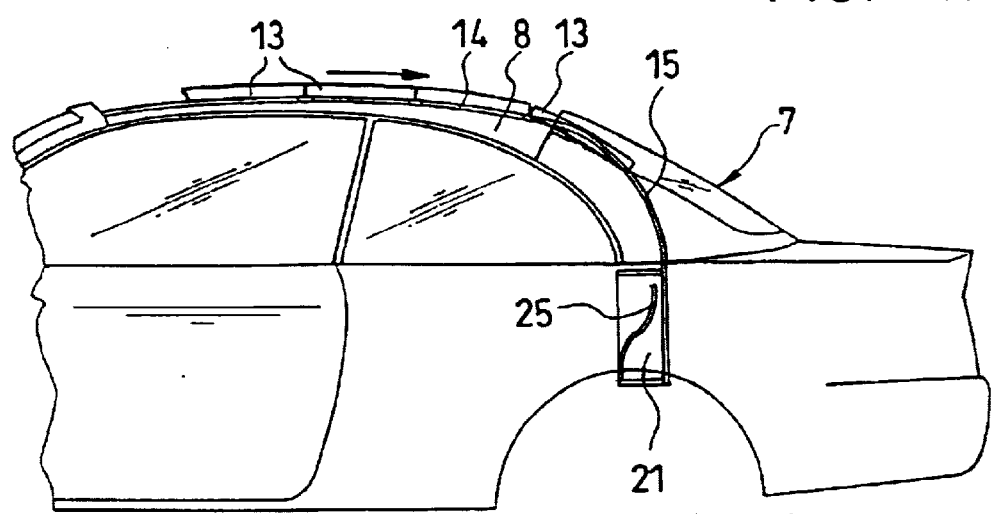
FIG. 5.2
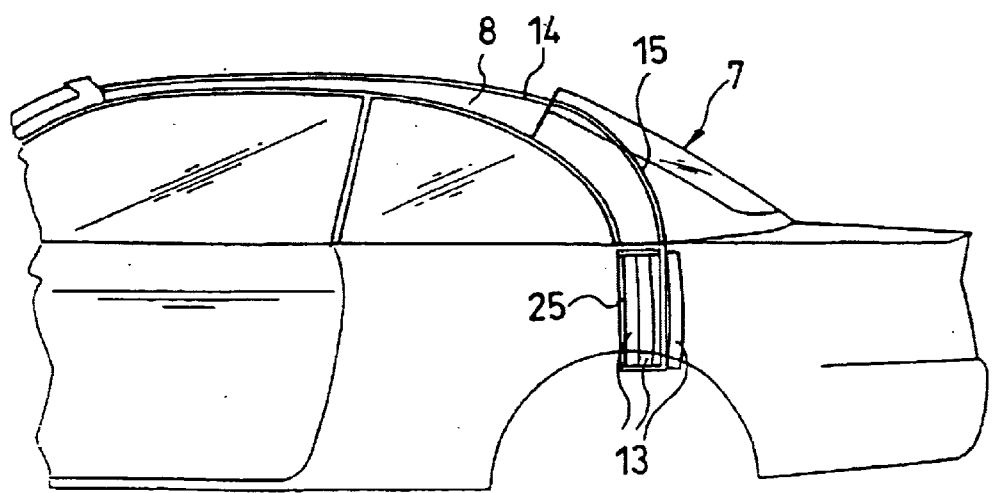
FIG. 5.3

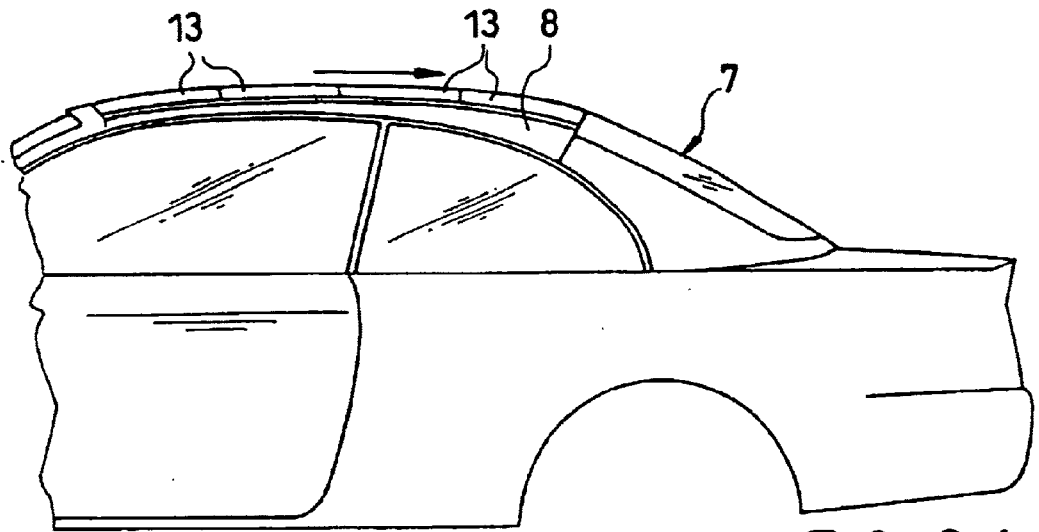
FIG. 6.1
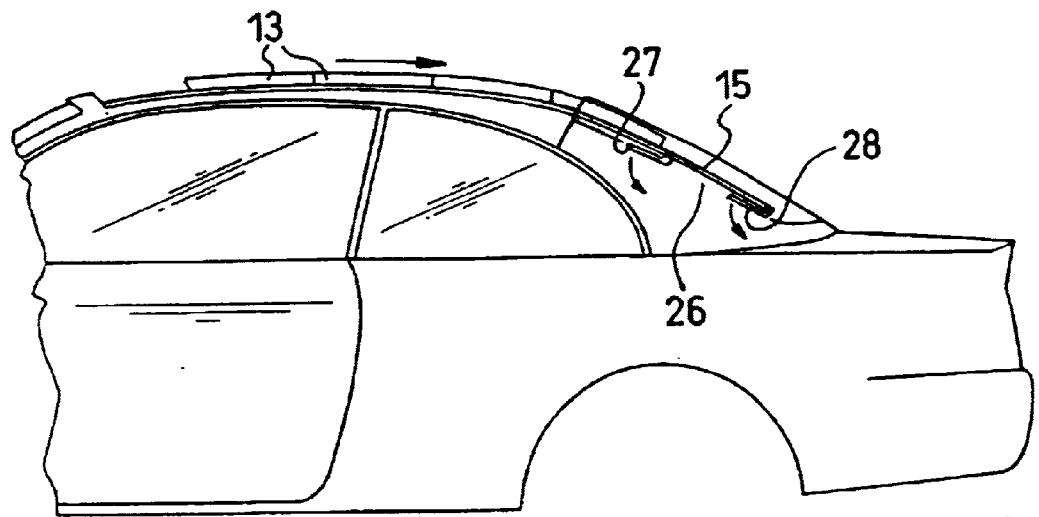
FIG. 6.2
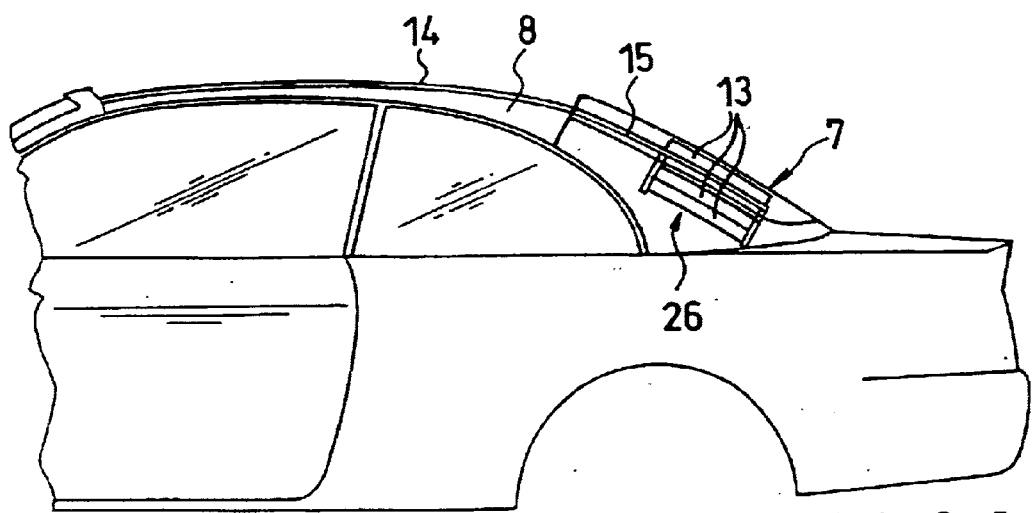
FIG. 6.3

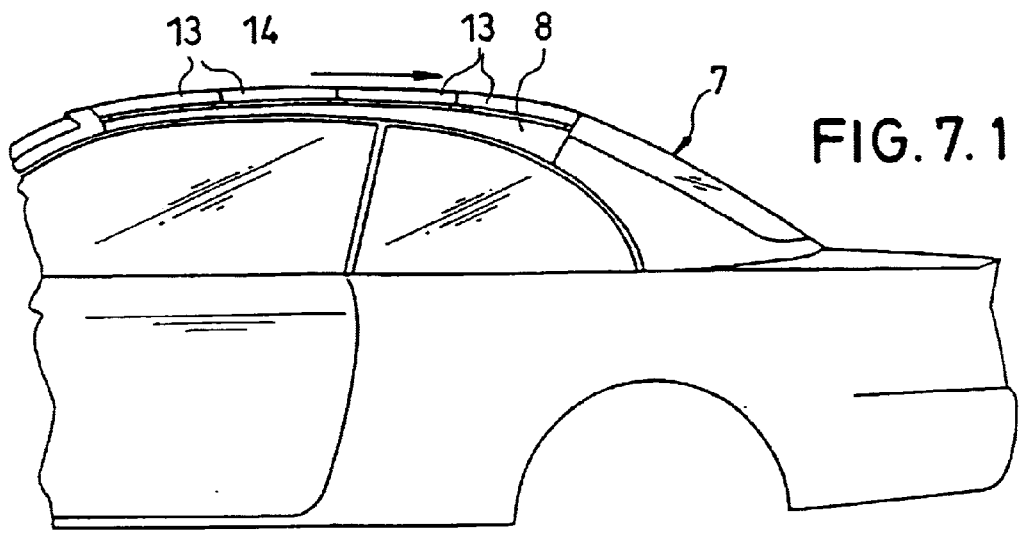
FIG. 7.1
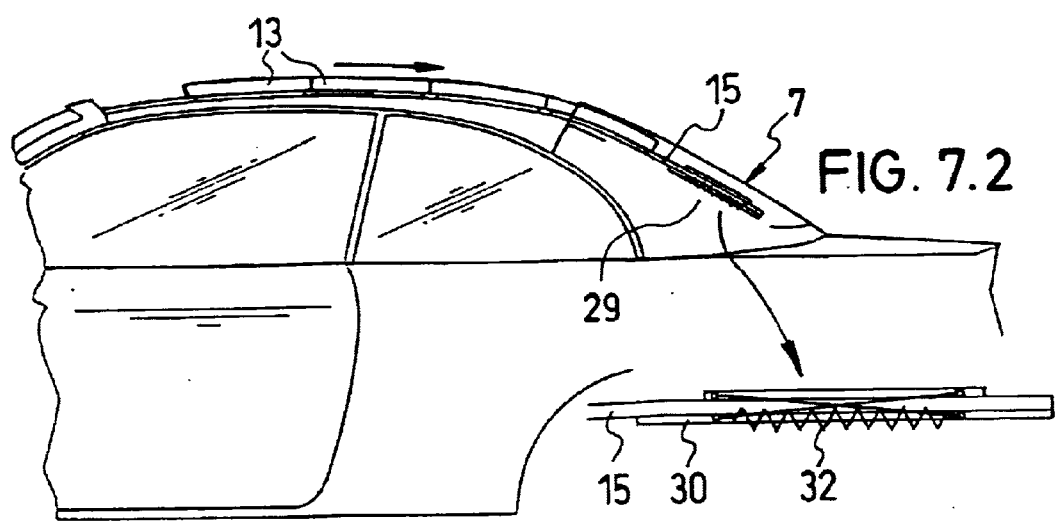
FIG. 7.2
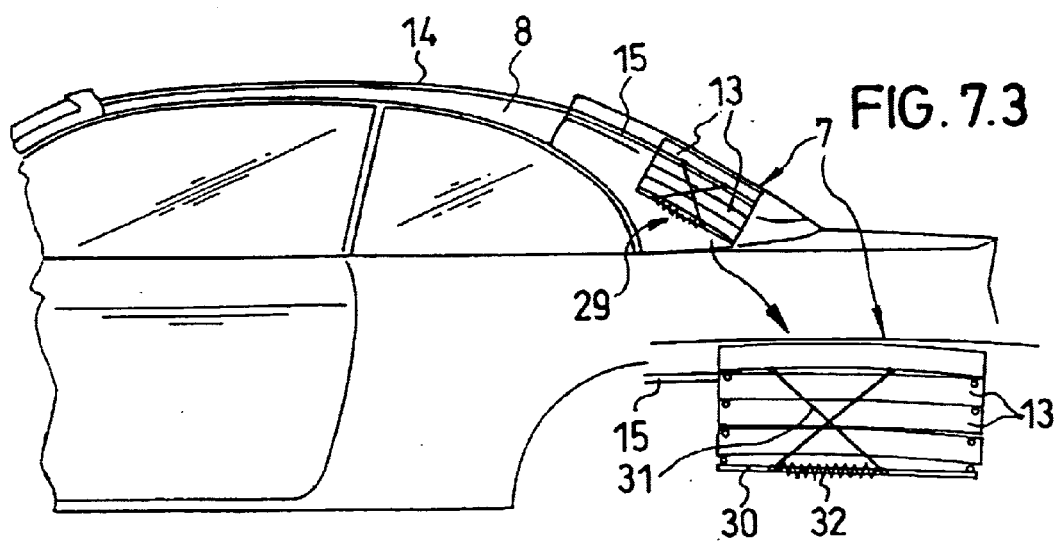
FIG. 7.3

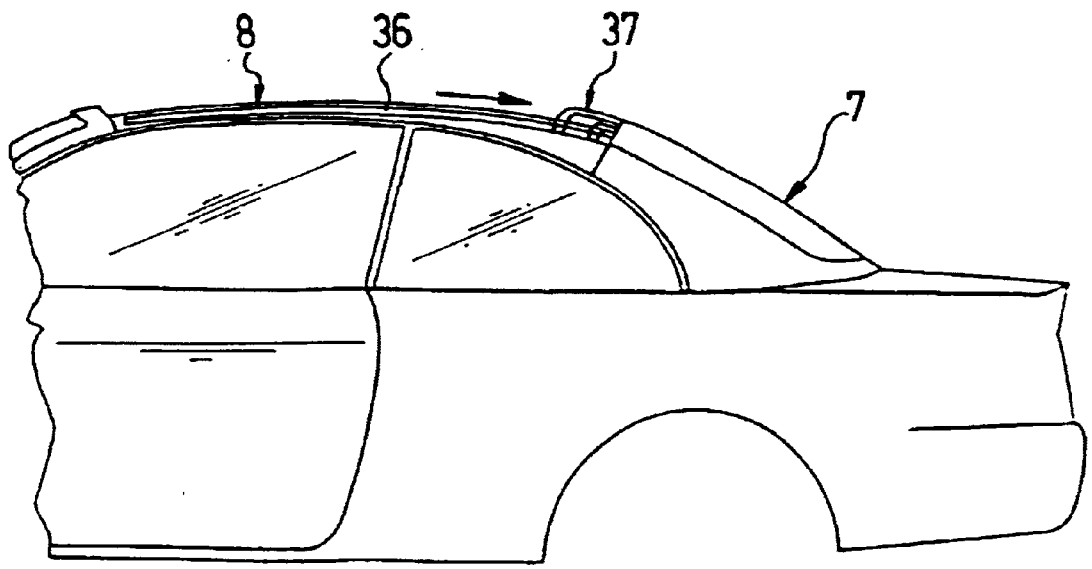
FIG. 10.1
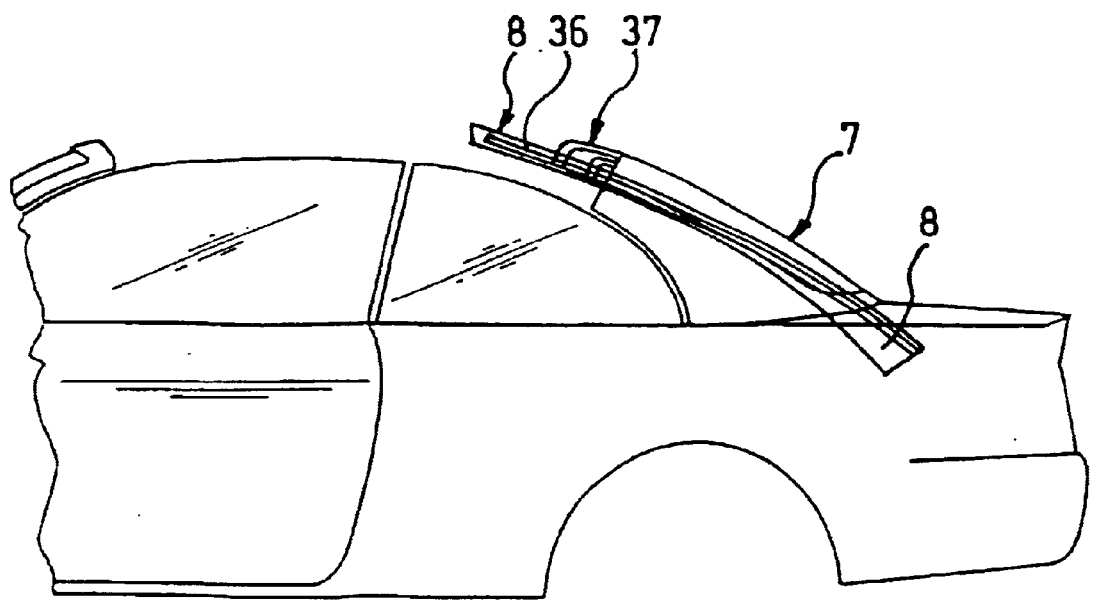
FIG. 10.2

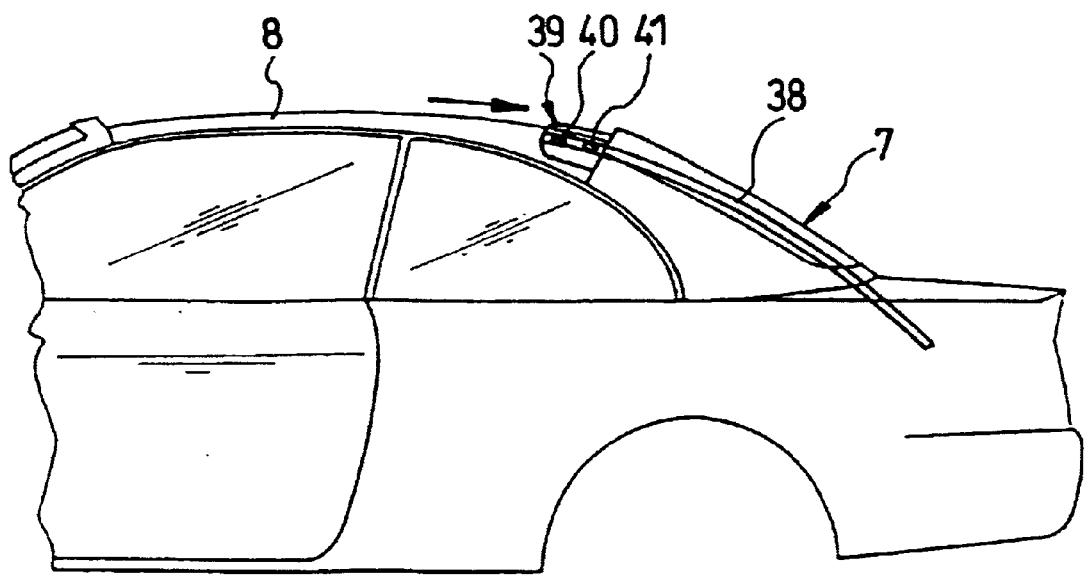
FIG. 11.1
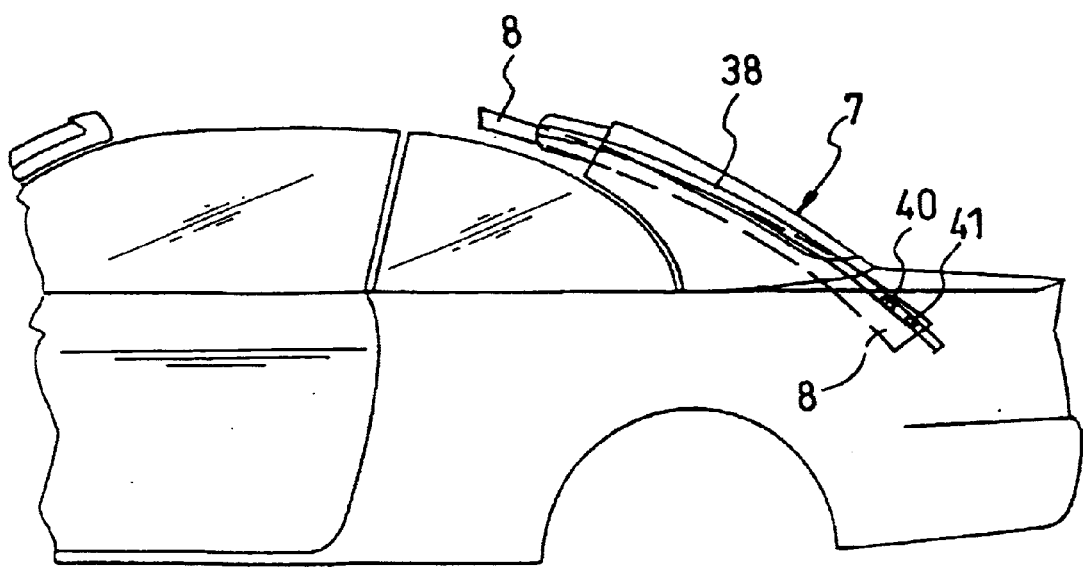
FIG. 11.2

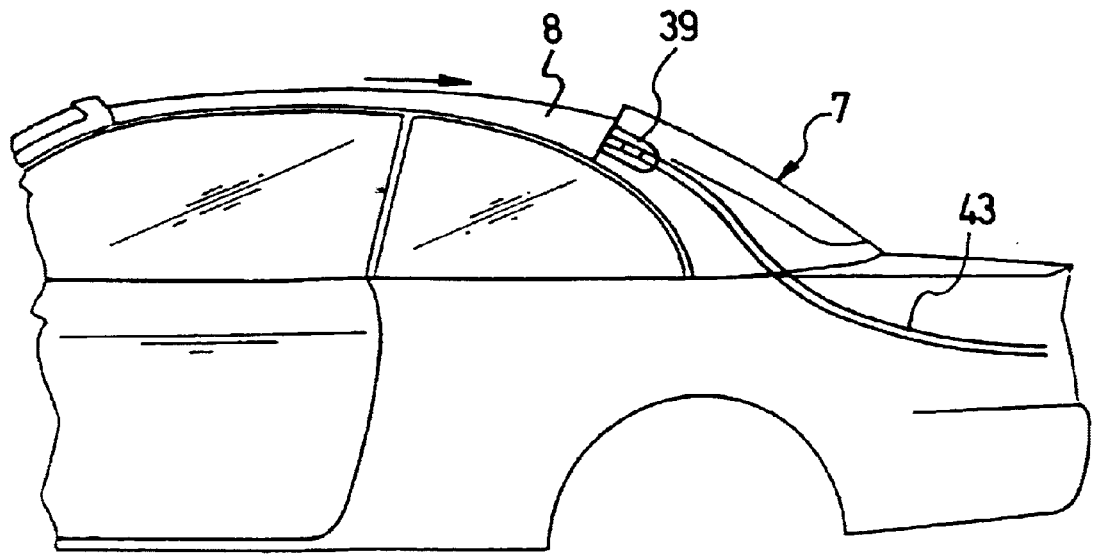
FIG. 12.1
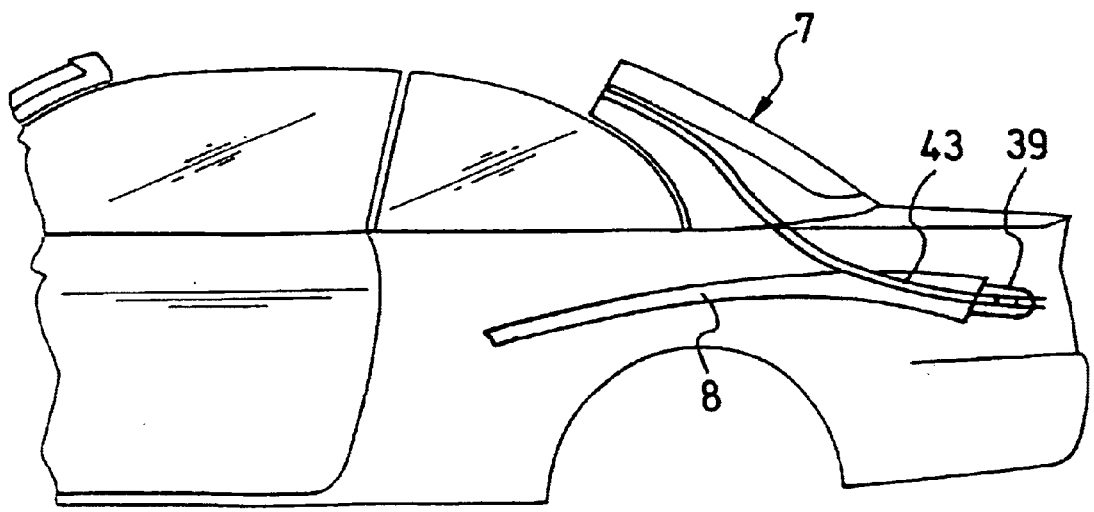
FIG. 12.2

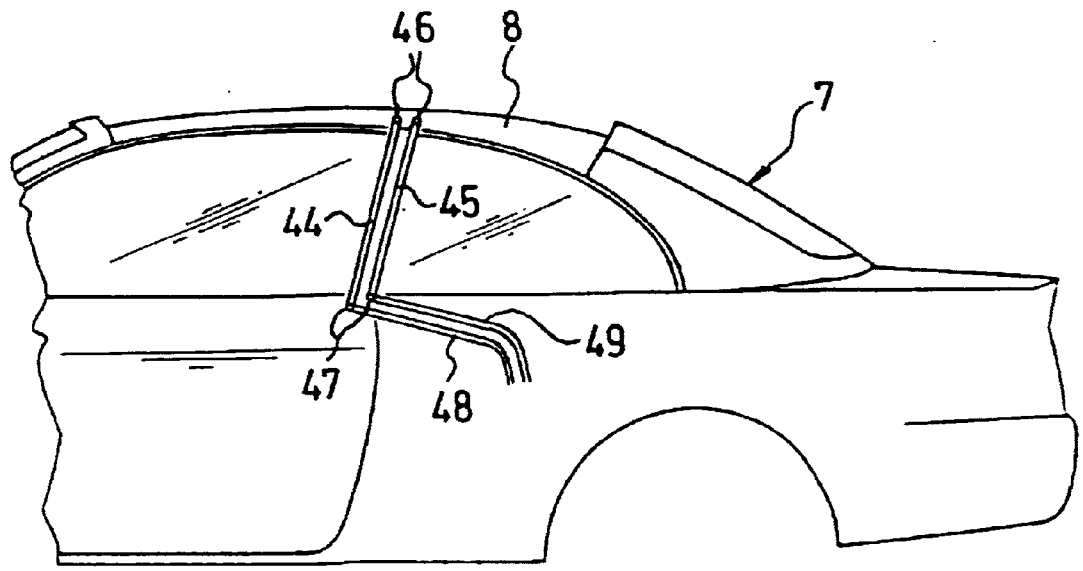
FIG. 13.1
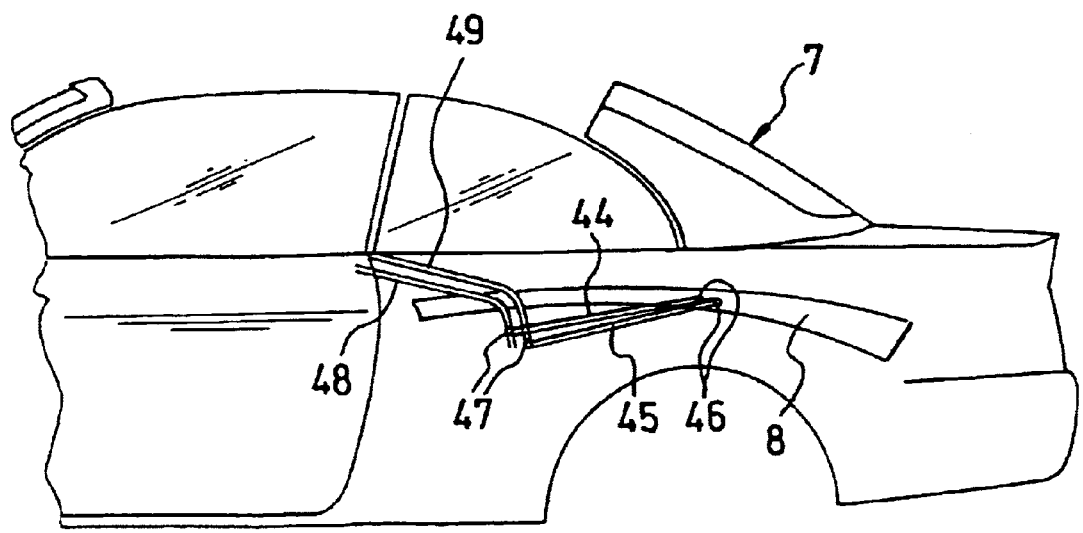
FIG. 13.2

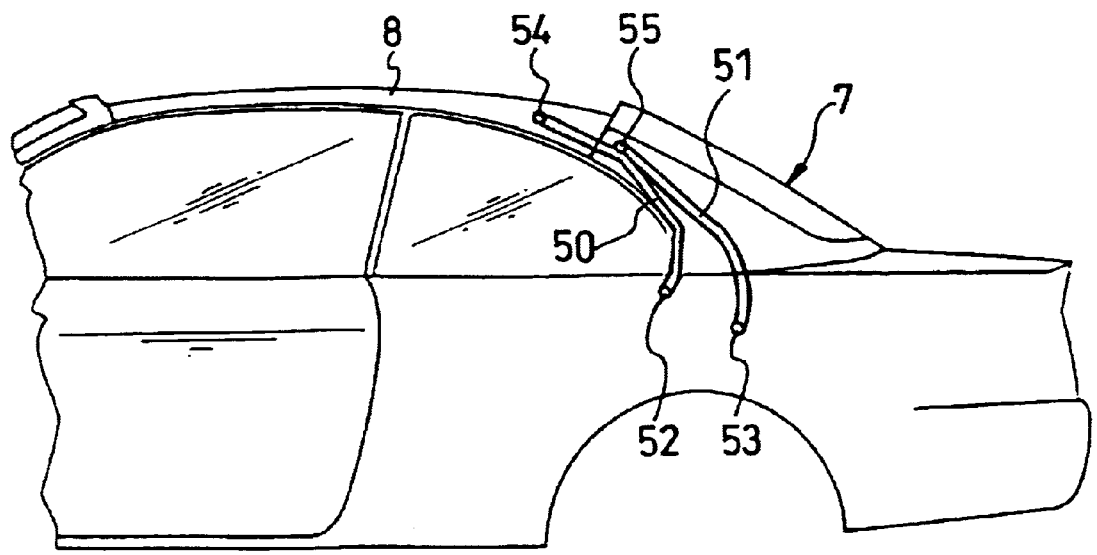
FIG. 14.1
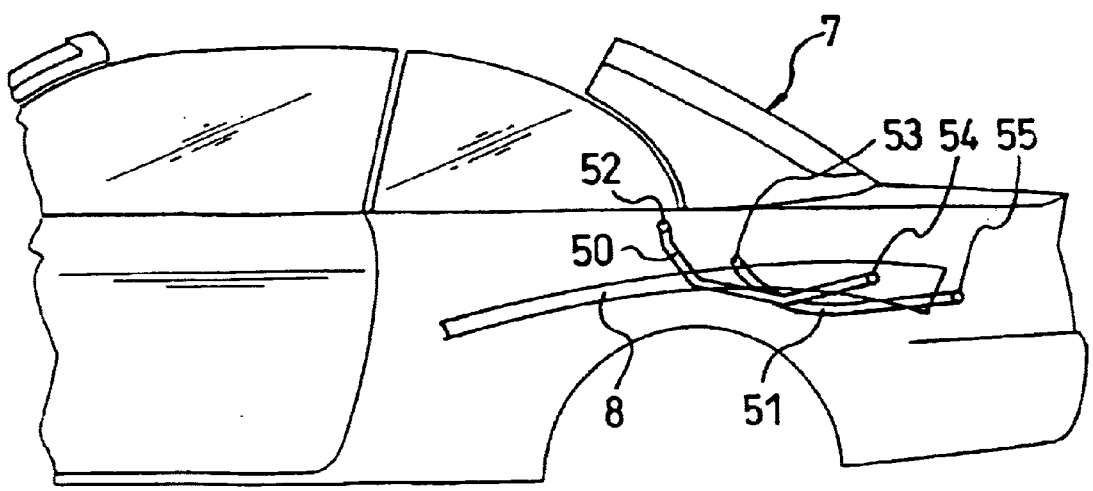
FIG. 14.2

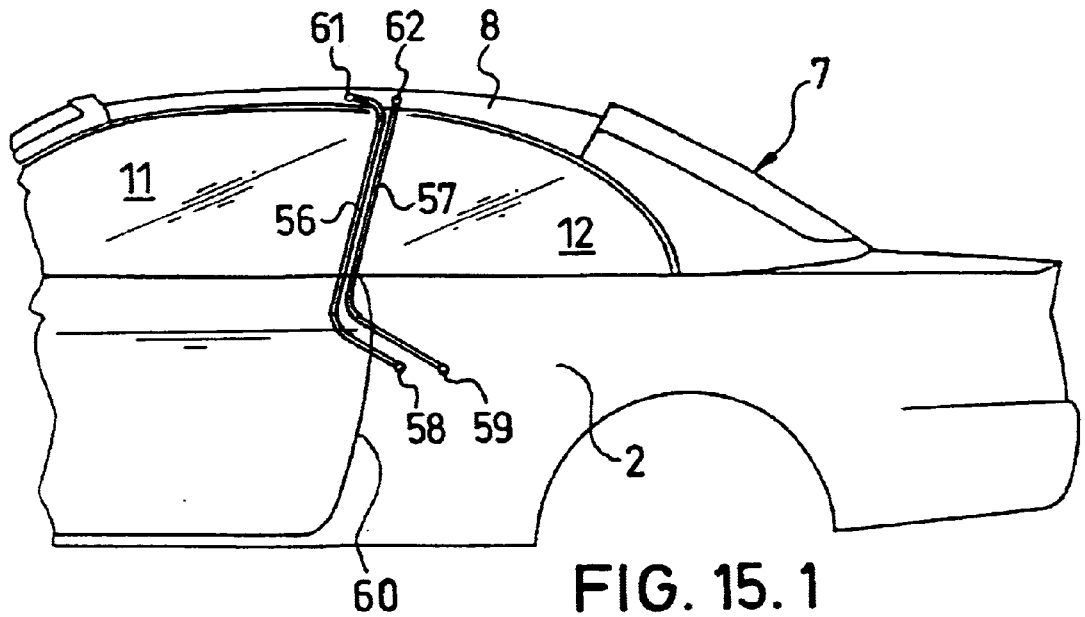
FIG. 15.1
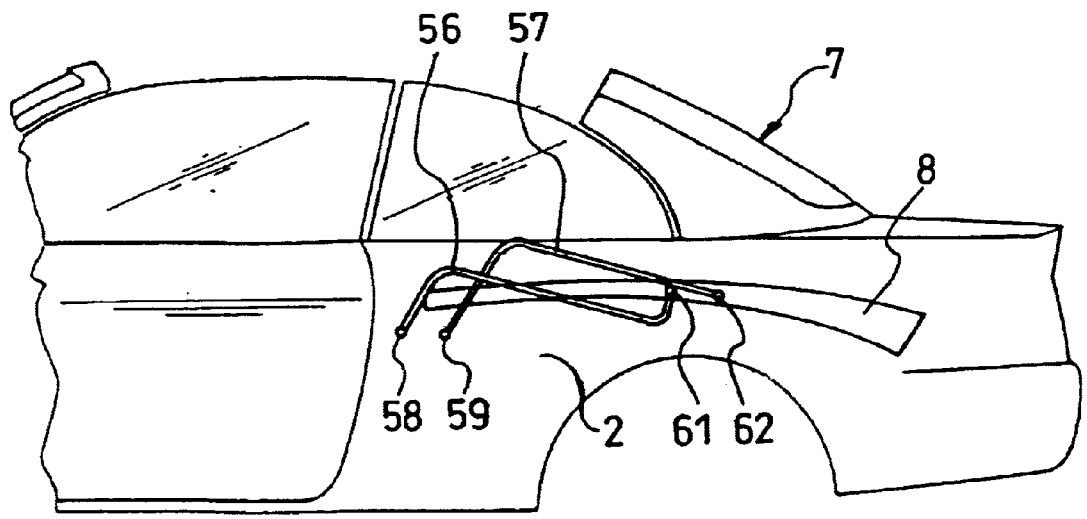
FIG. 15.2

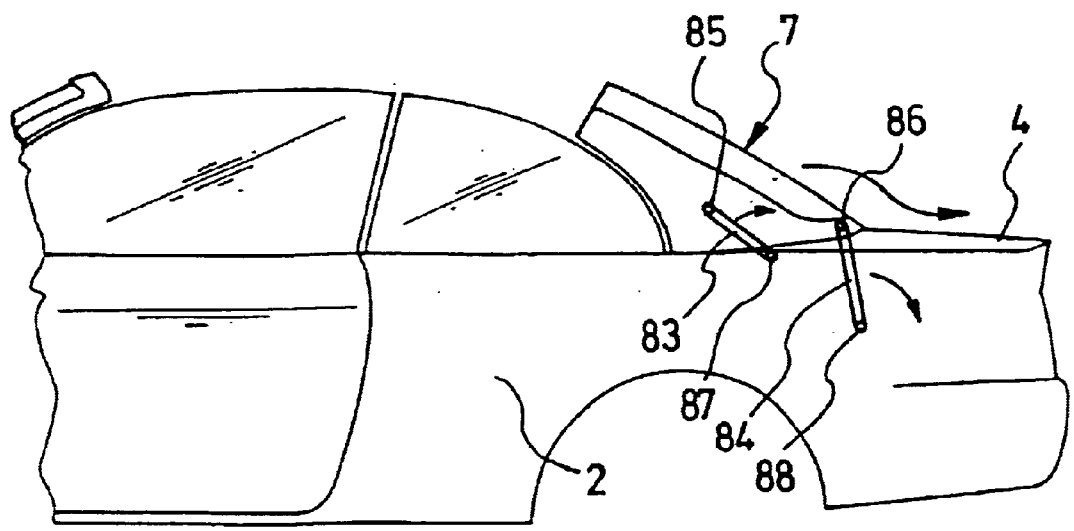
FIG. 21.1
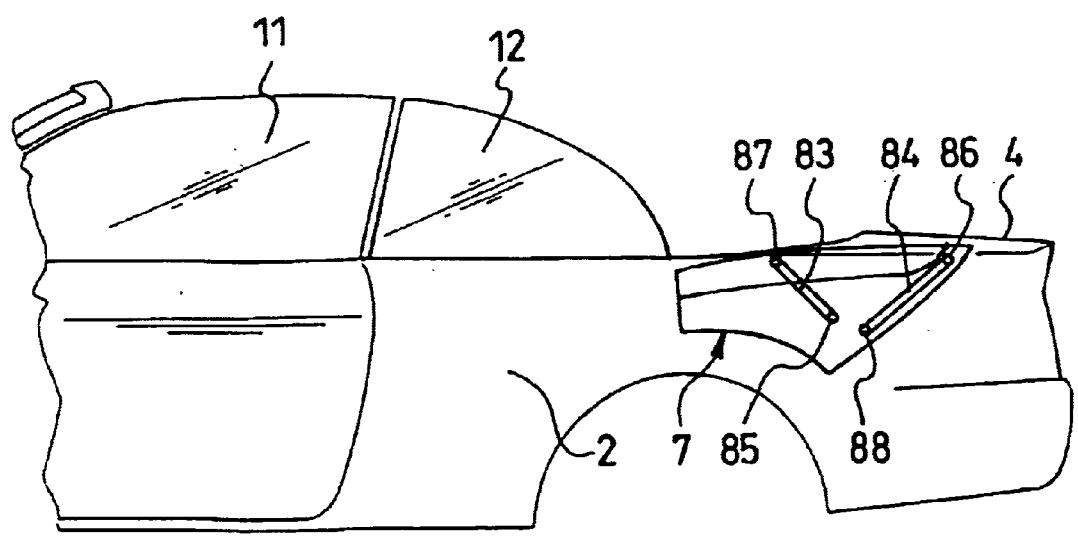
FIG. 21.2

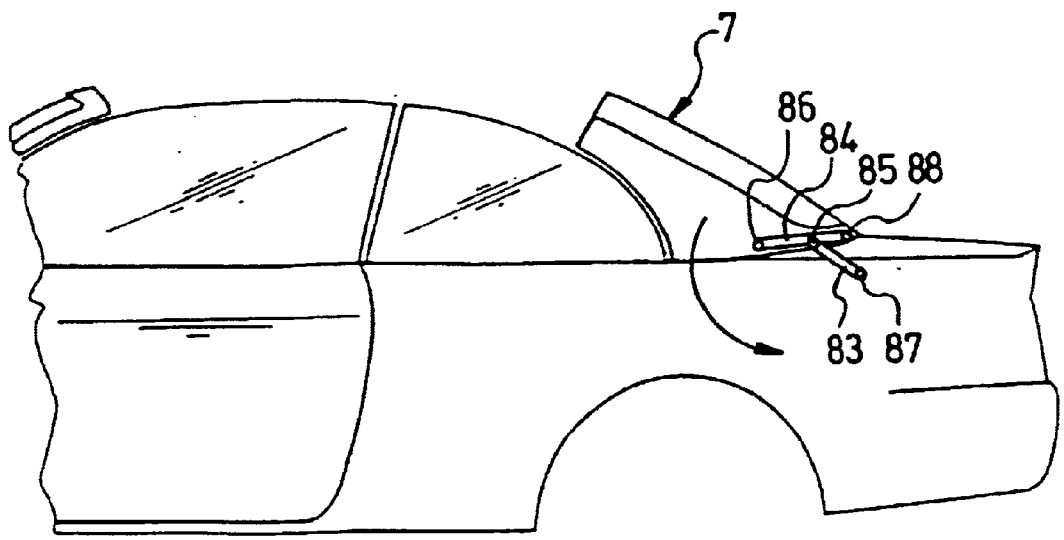
FIG. 22.1
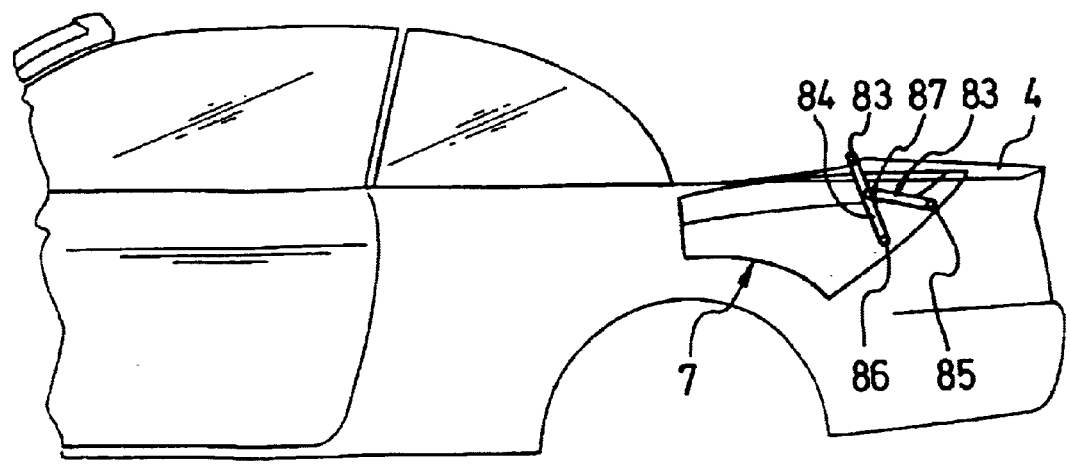
FIG. 22.2

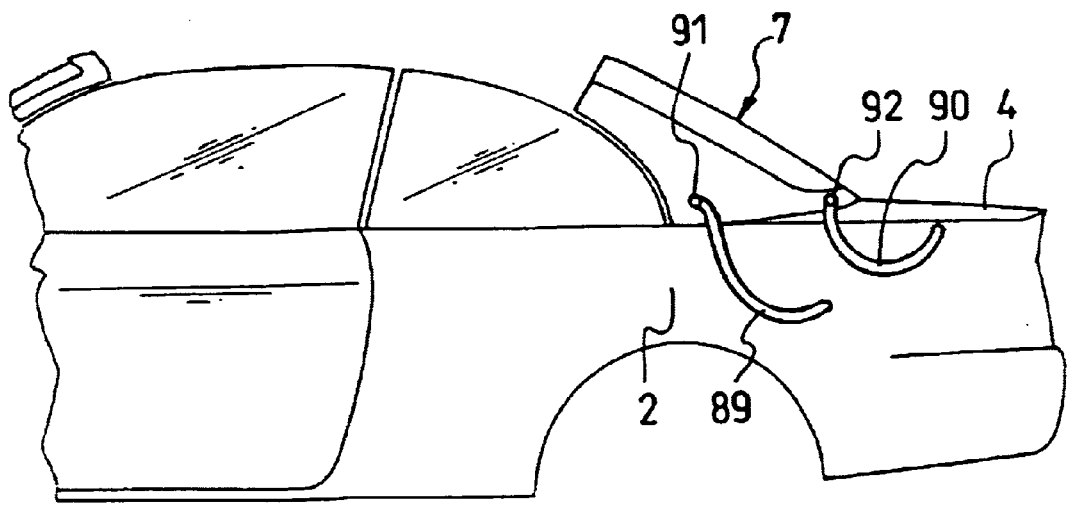
FIG. 23.1
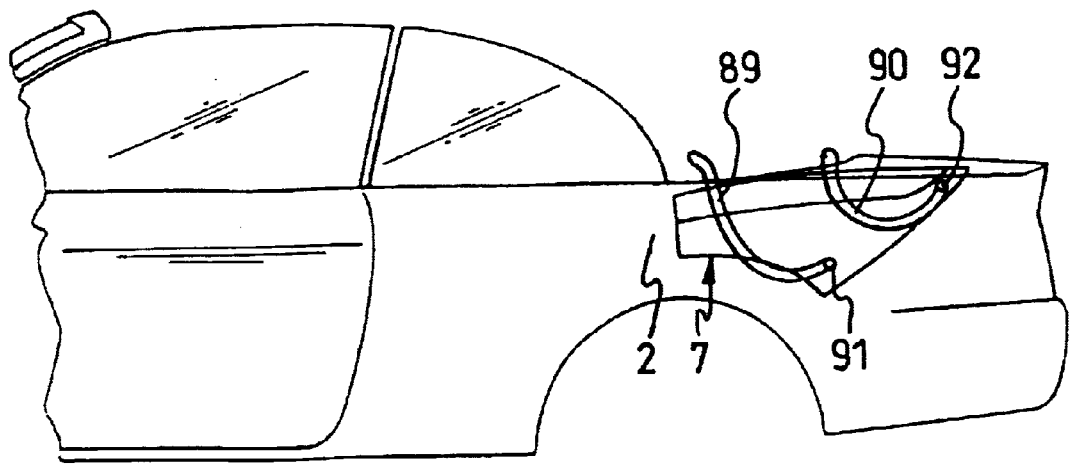
FIG. 23.2

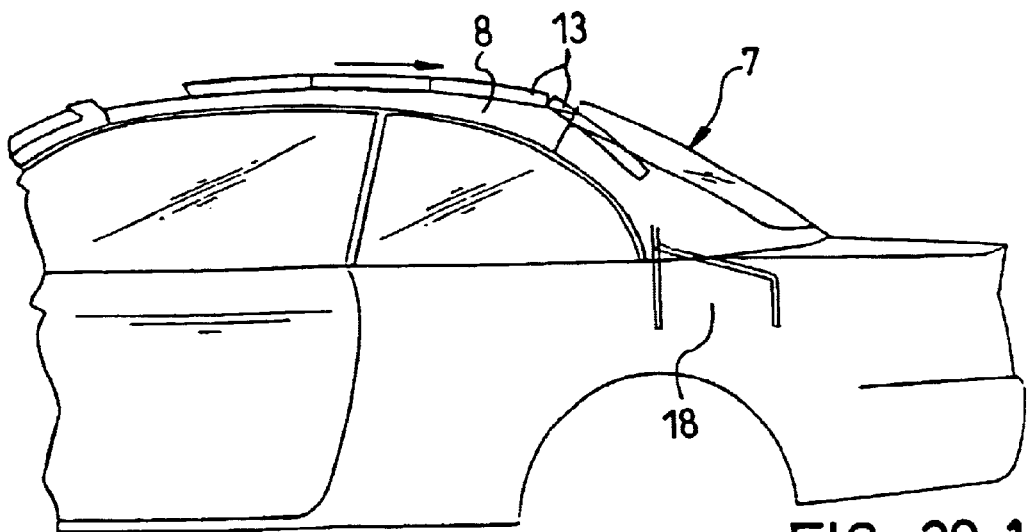
FIG. 29.1
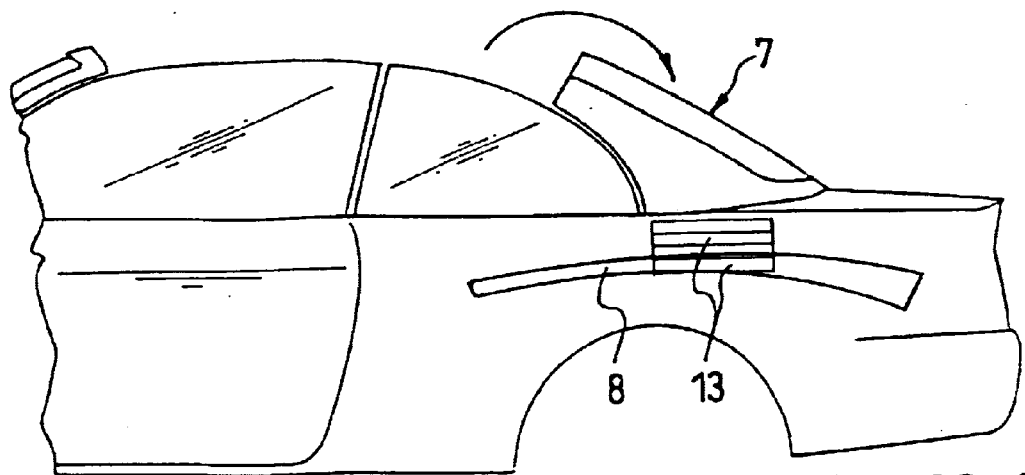
FIG. 29.2
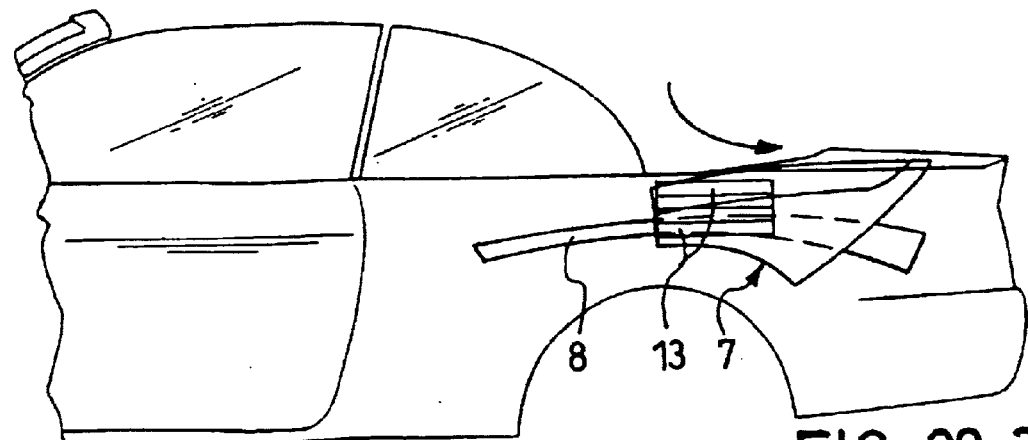
FIG. 29.3

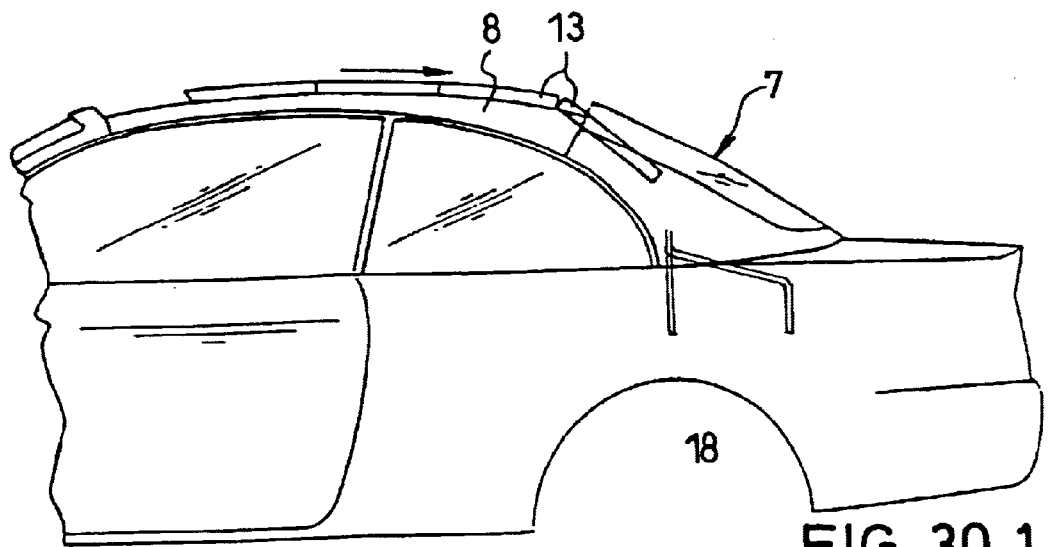
FIG. 30.1
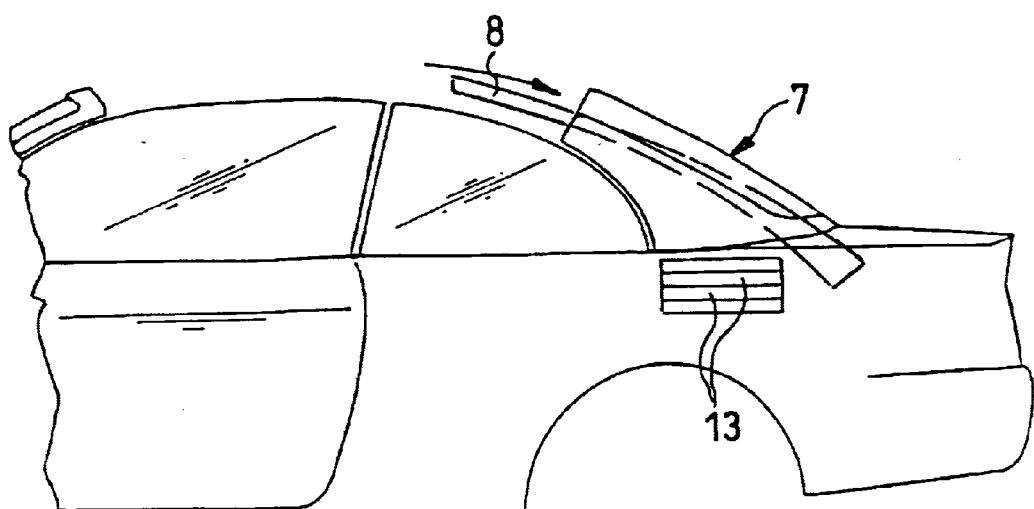
FIG. 30.2
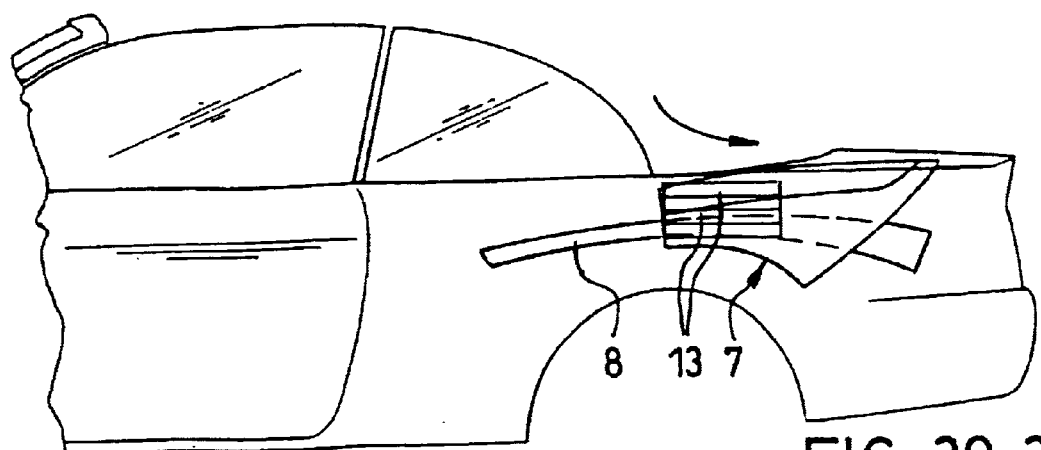
FIG. 30.3

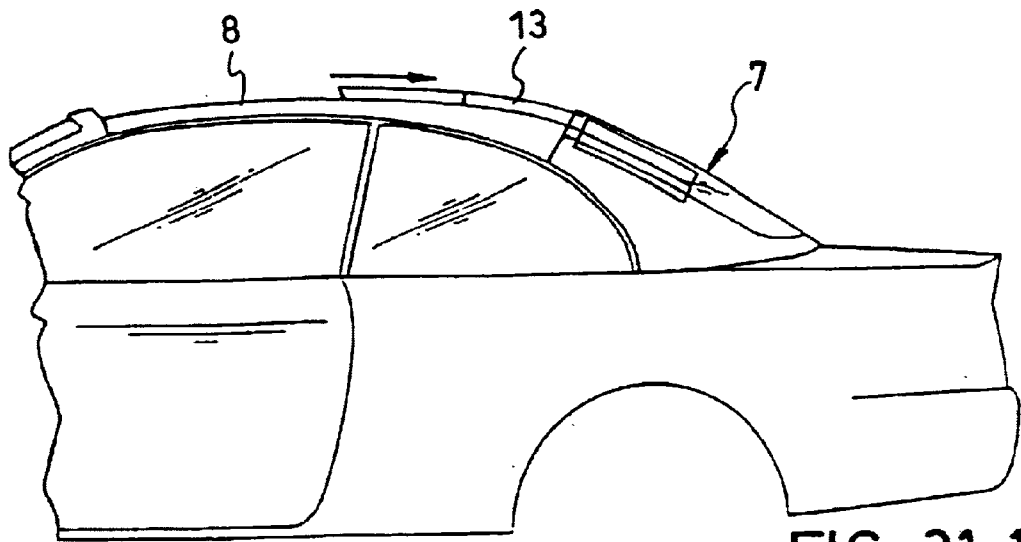
FIG. 31.1
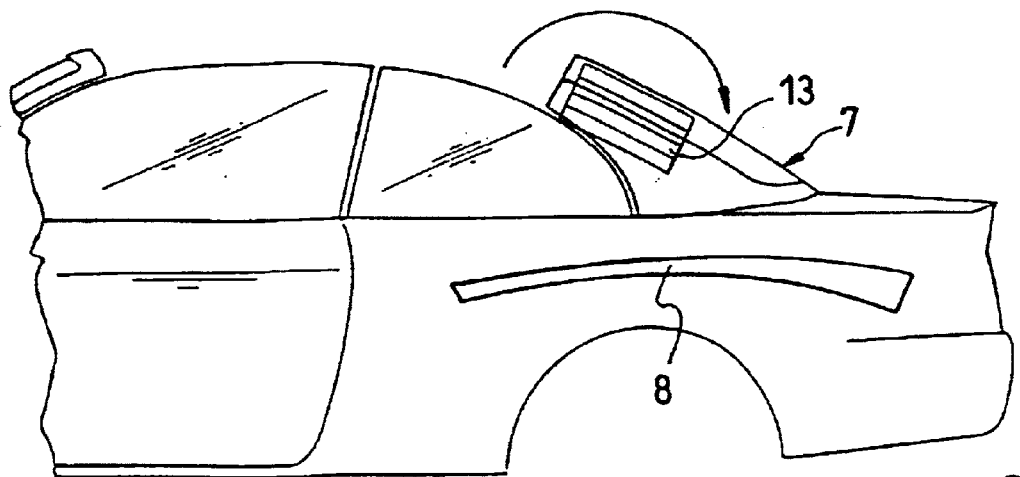
FIG. 31.2
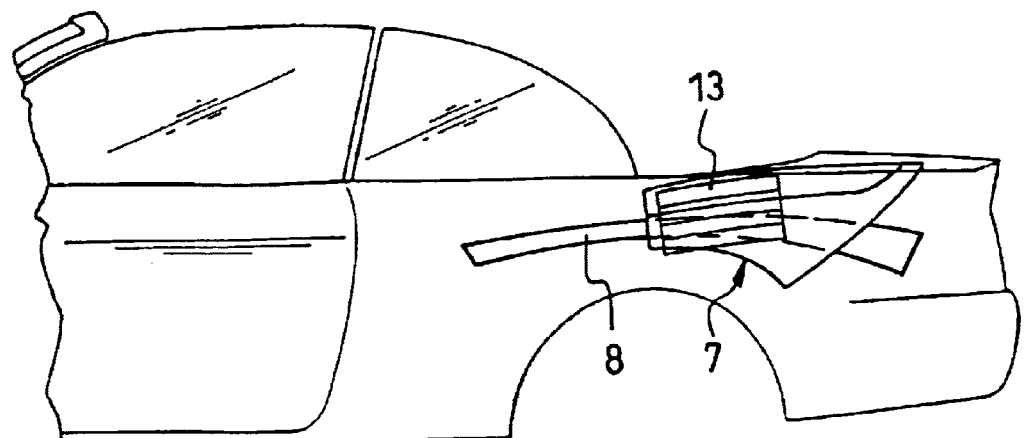
FIG. 31.3

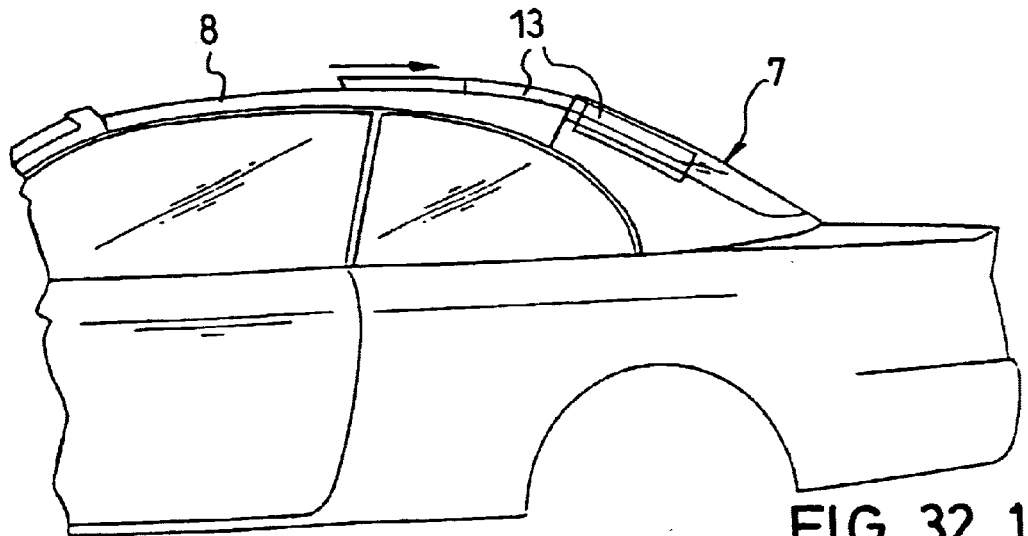
FIG. 32.1
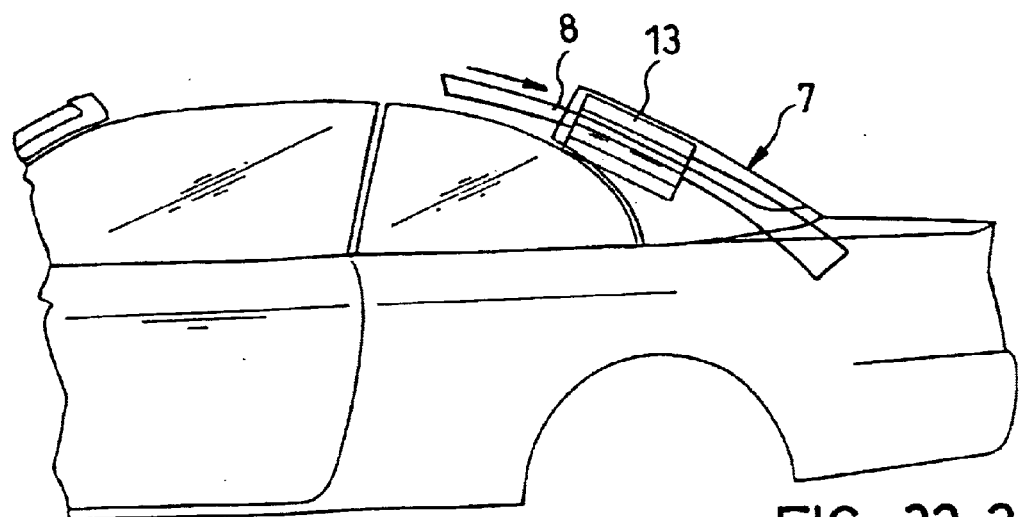
FIG. 32.2
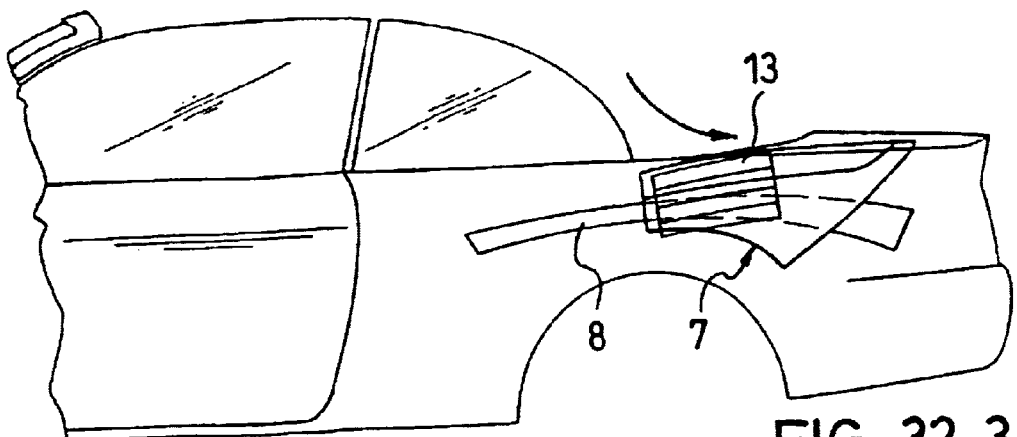
FIG. 32.3

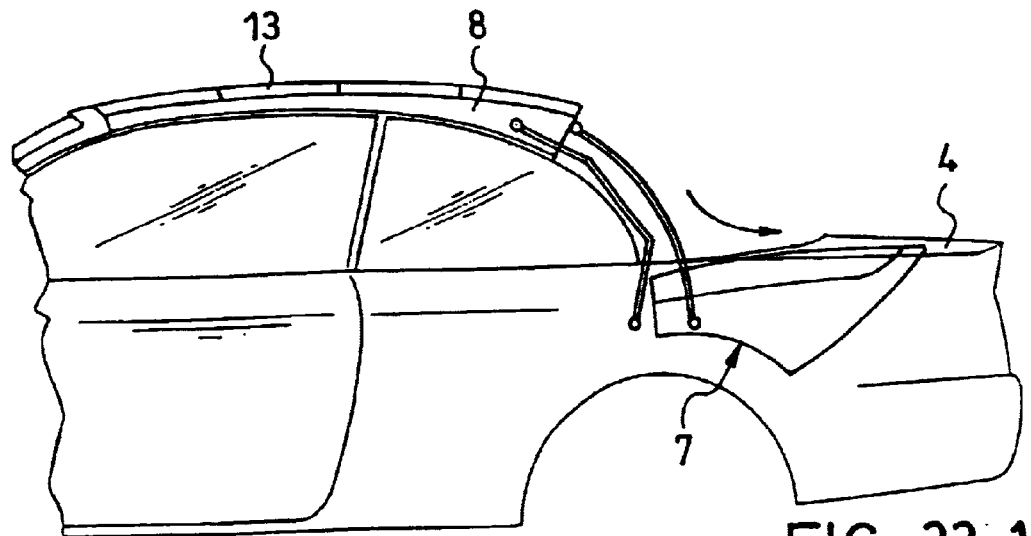
FIG. 33.1
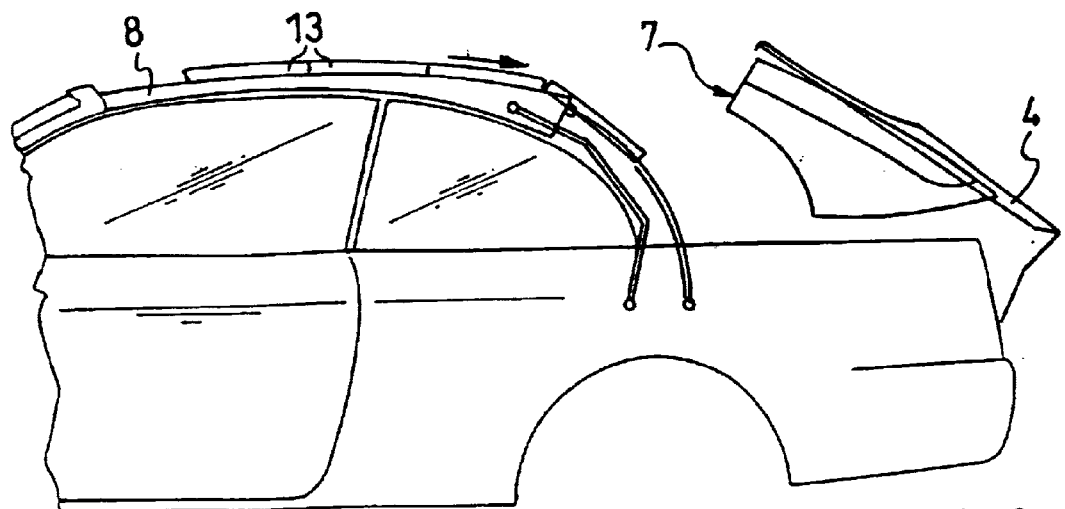
FIG. 33.2
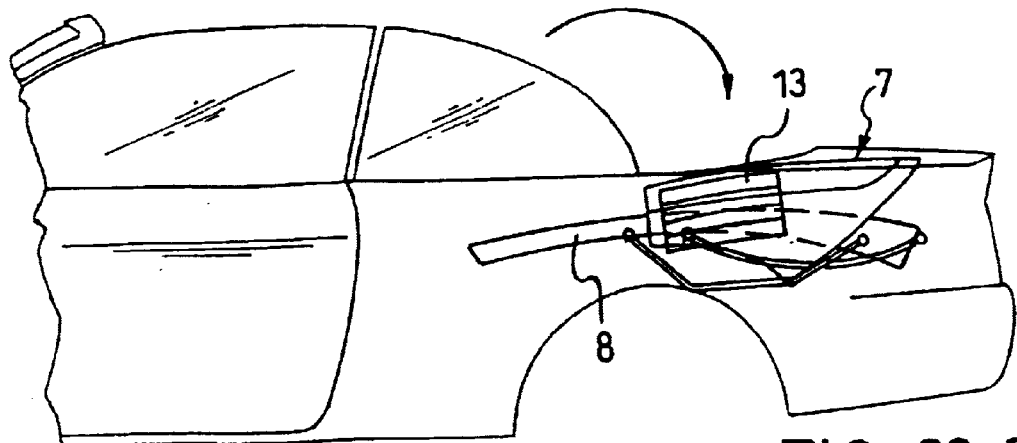
FIG. 33.3

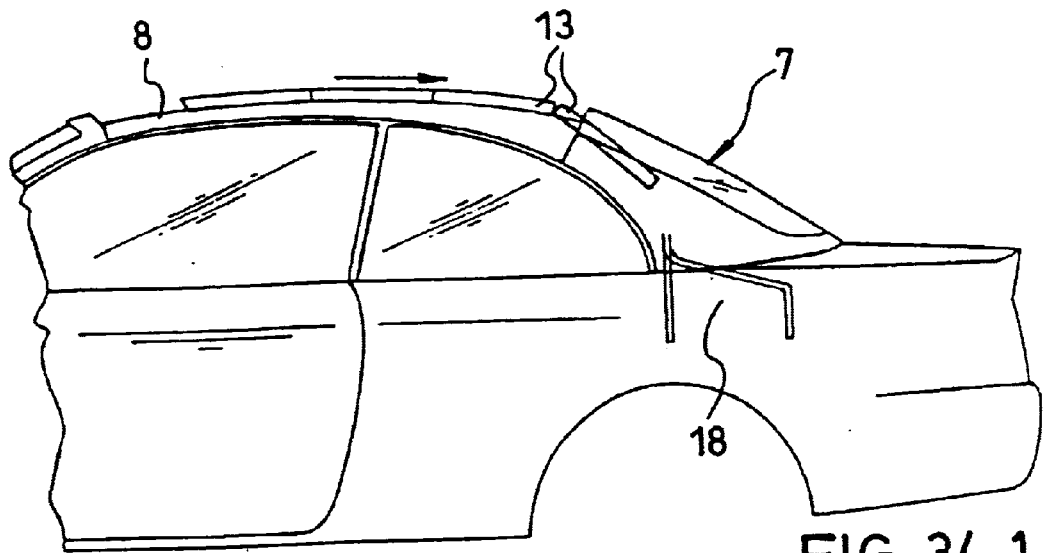
FIG. 34.1
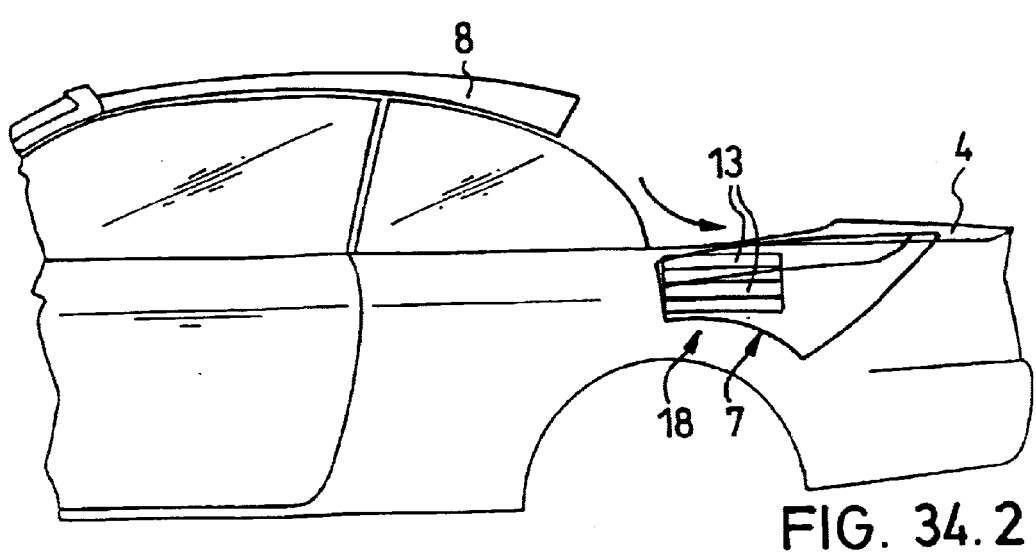
FIG. 34.2
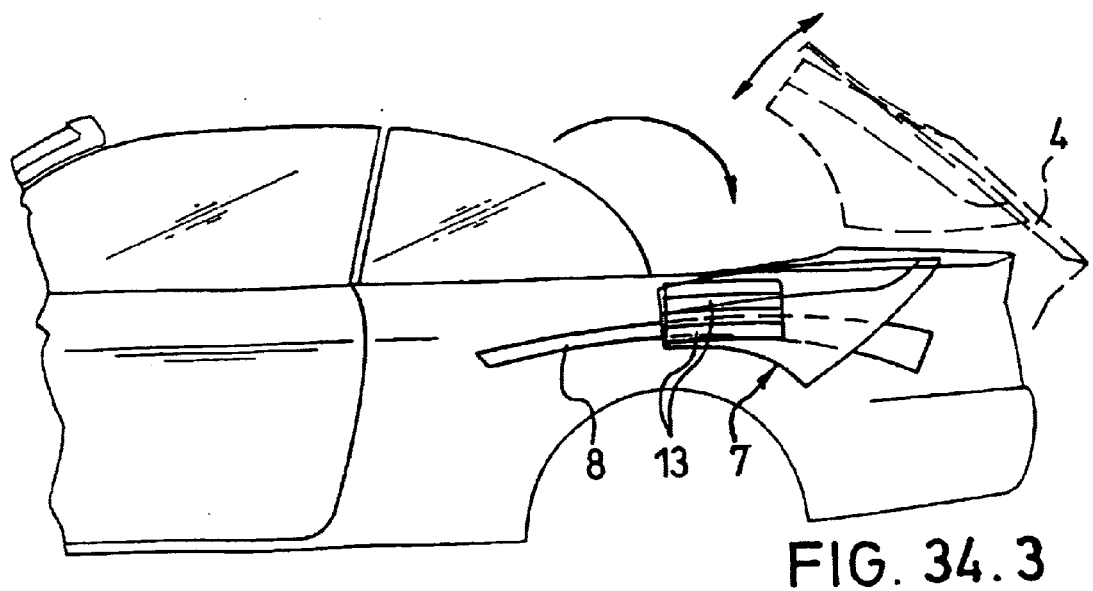
FIG. 34.3

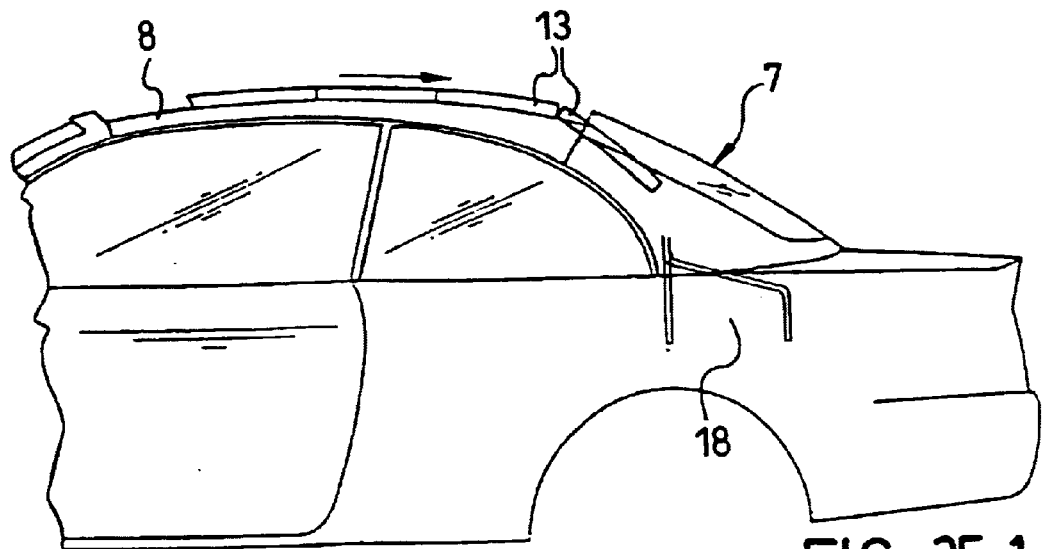
FIG. 35.1
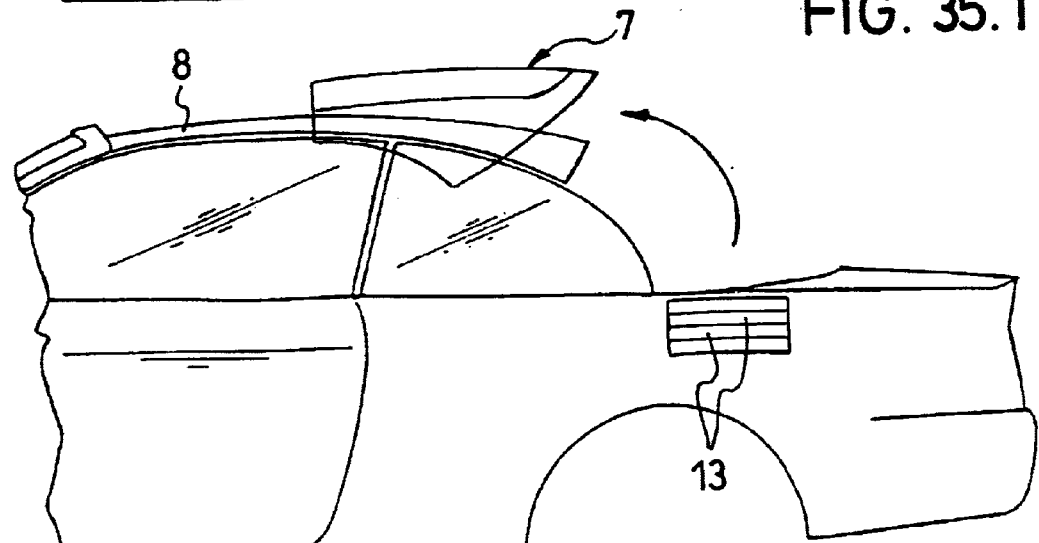
FIG. 35.2
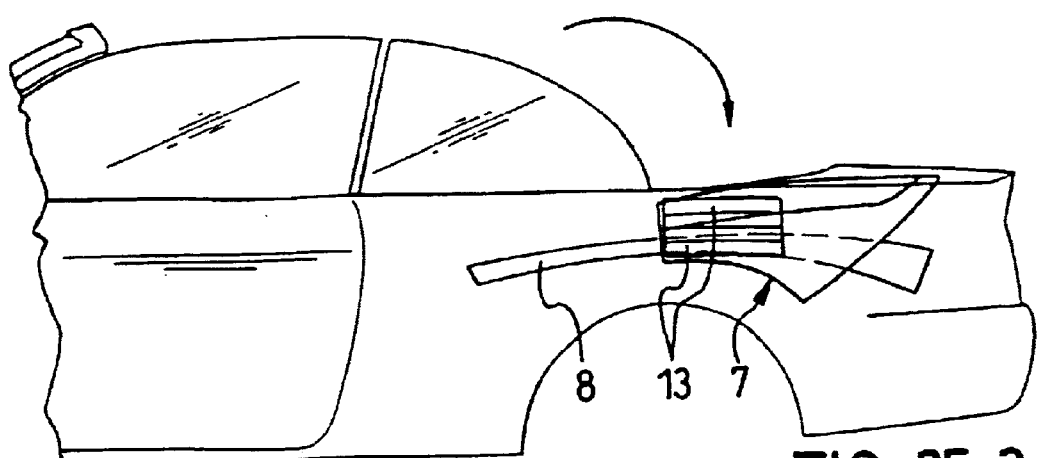
FIG. 35.3

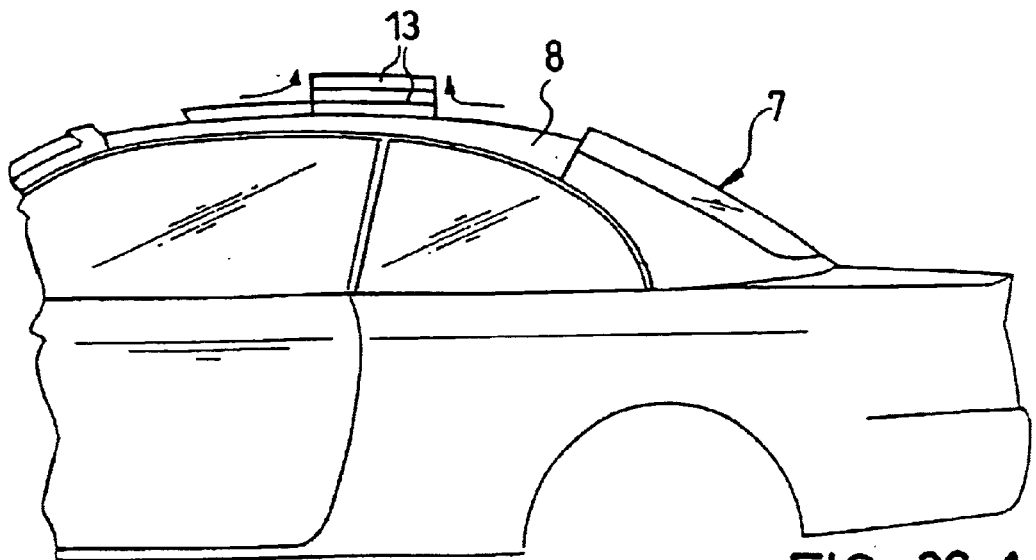
FIG. 36.1
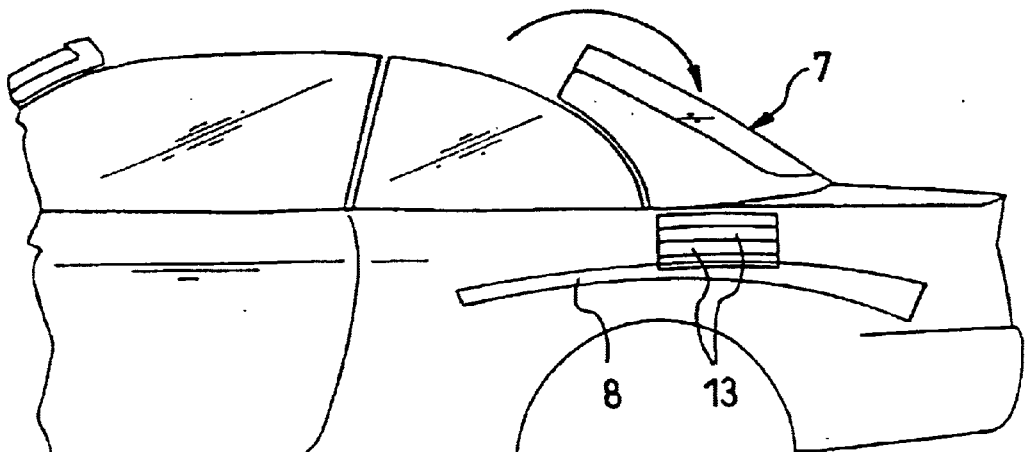
FIG. 36.2
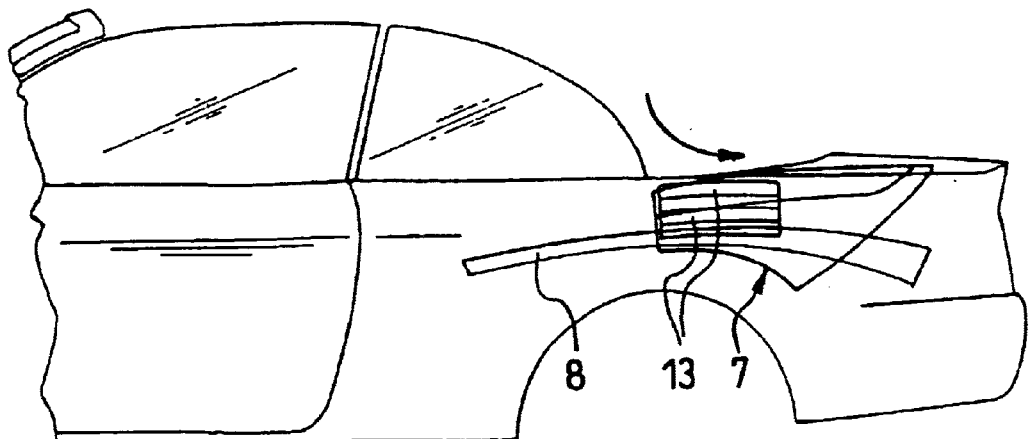
FIG. 36.3

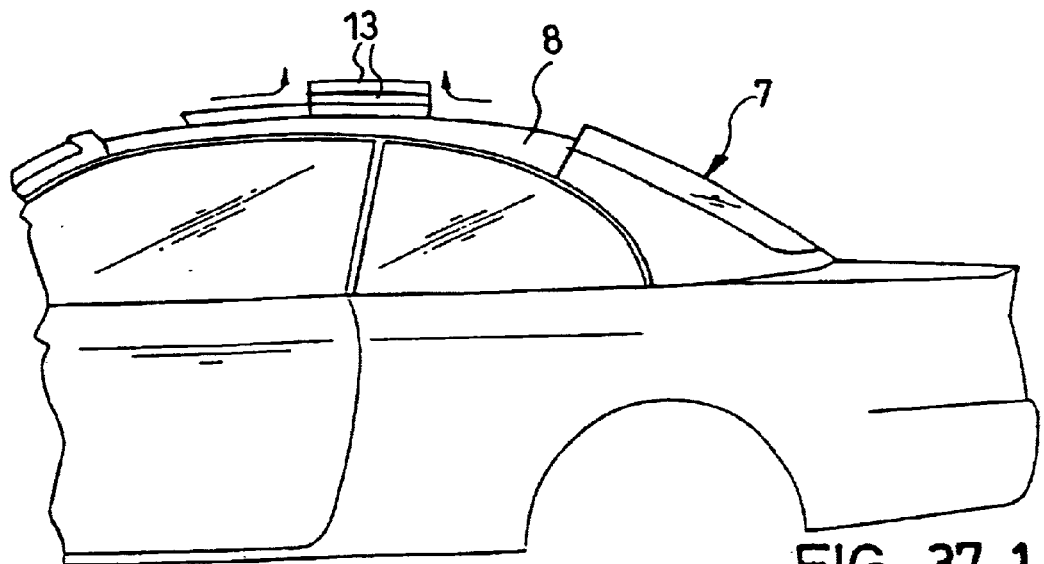
FIG. 37.1
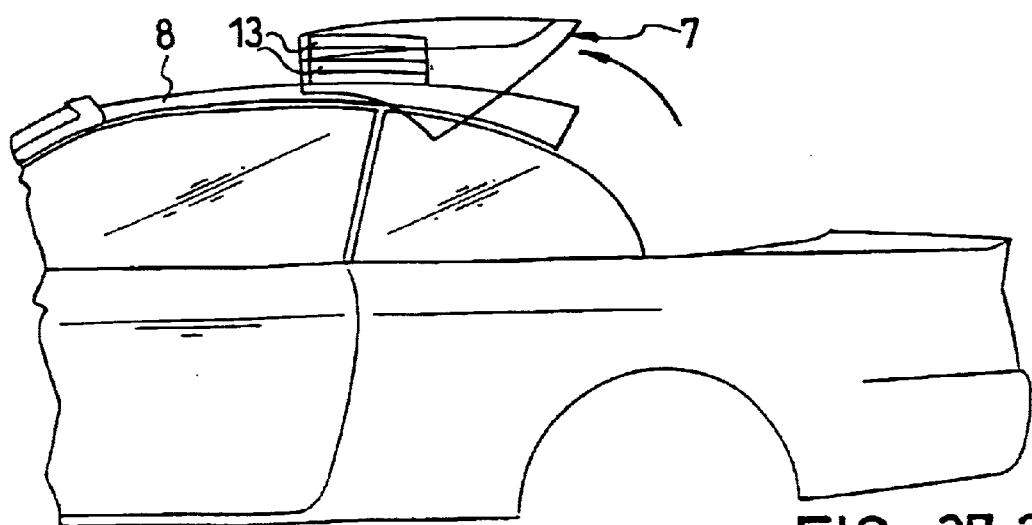
FIG. 37.2
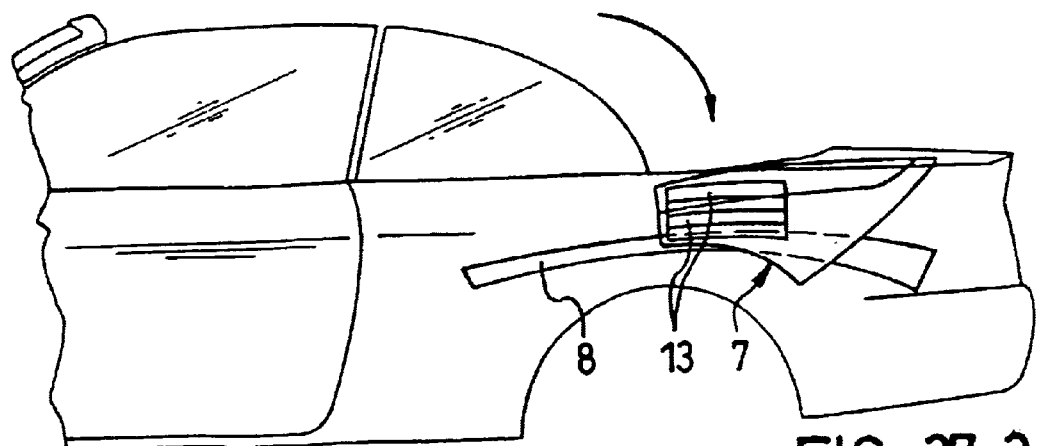
FIG. 37.3

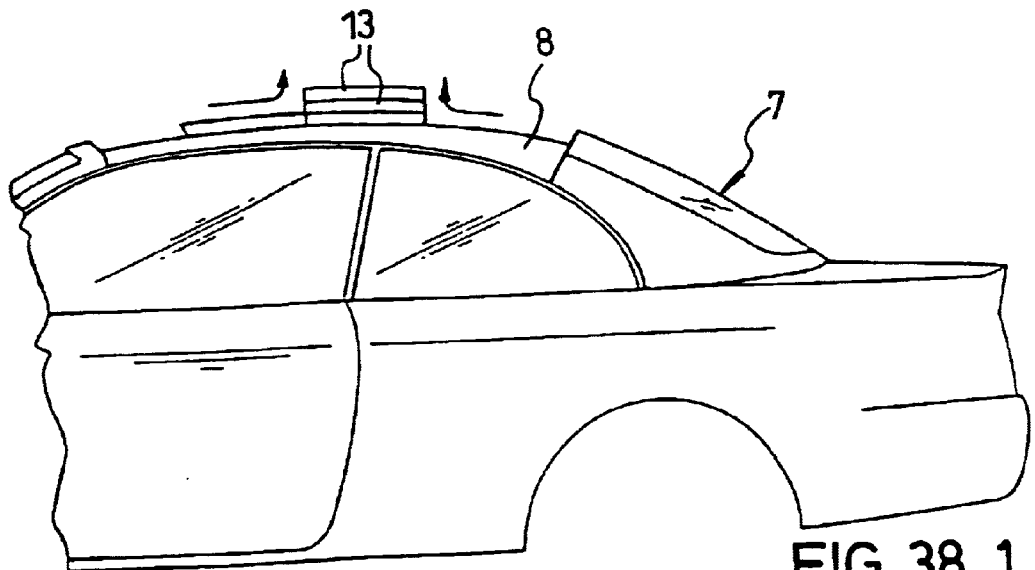
FIG. 38.1
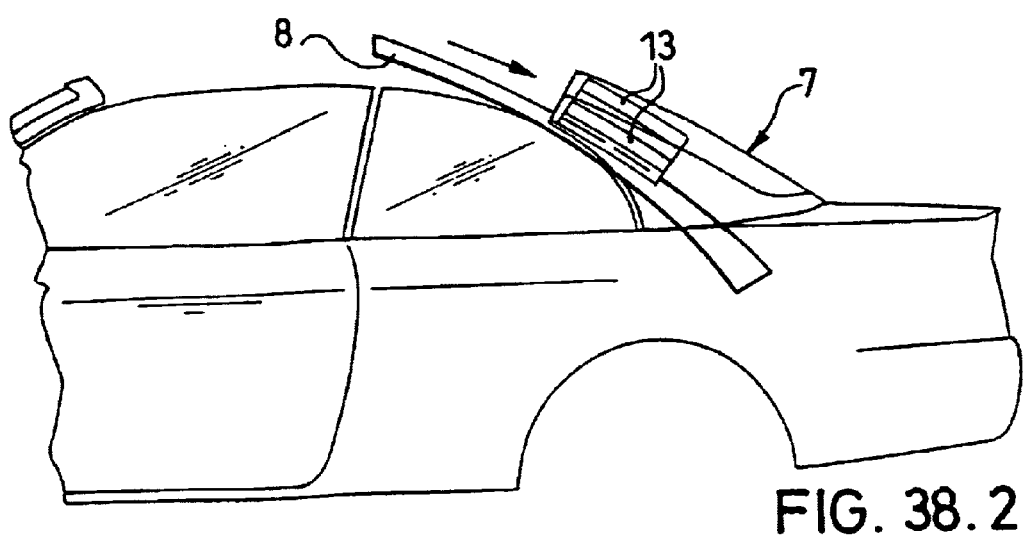
FIG. 38.2
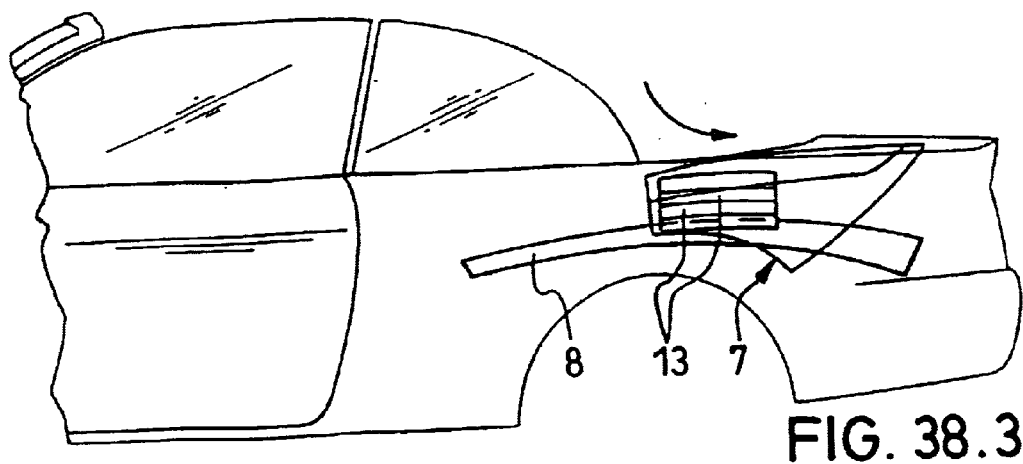
FIG. 38.3

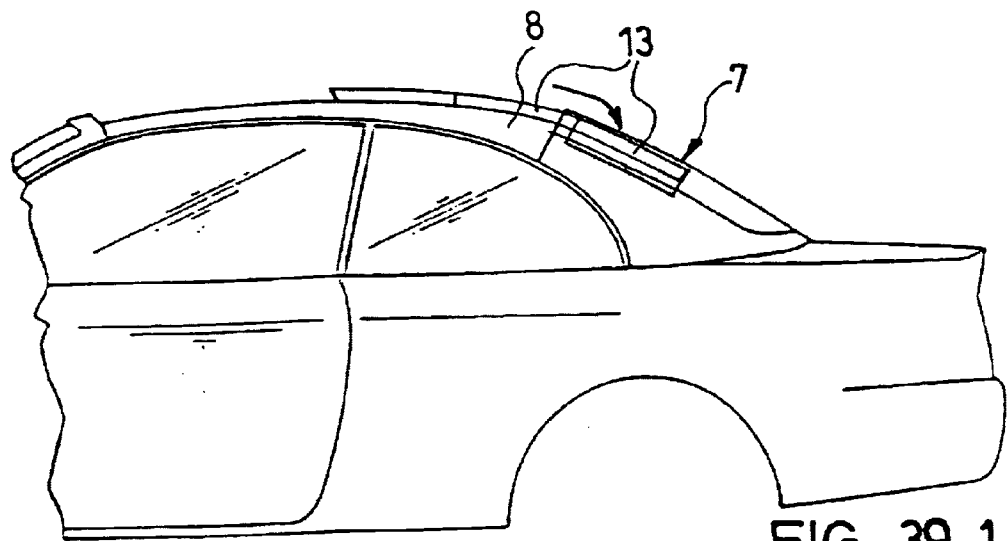
FIG. 39.1
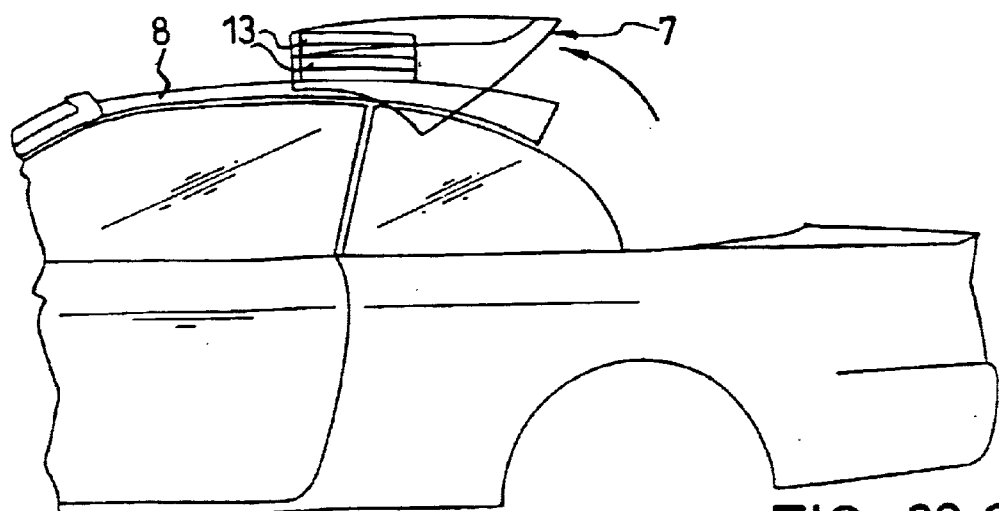
FIG. 39.2
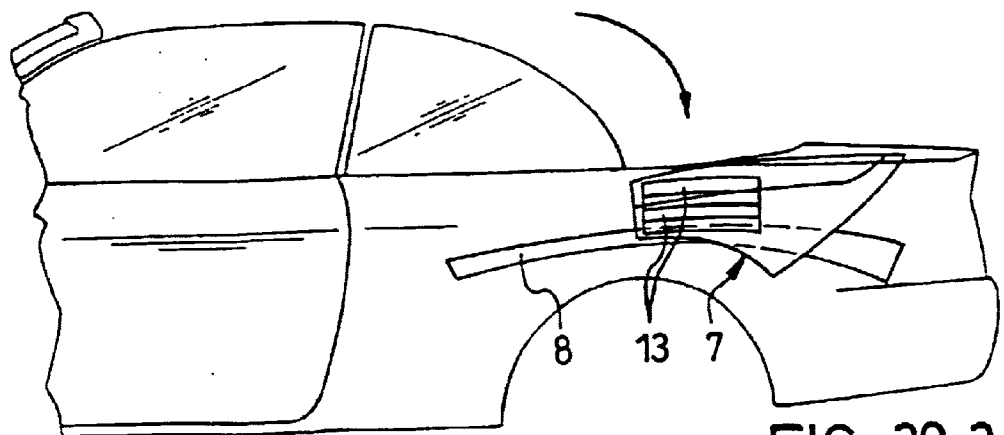
FIG. 39.3

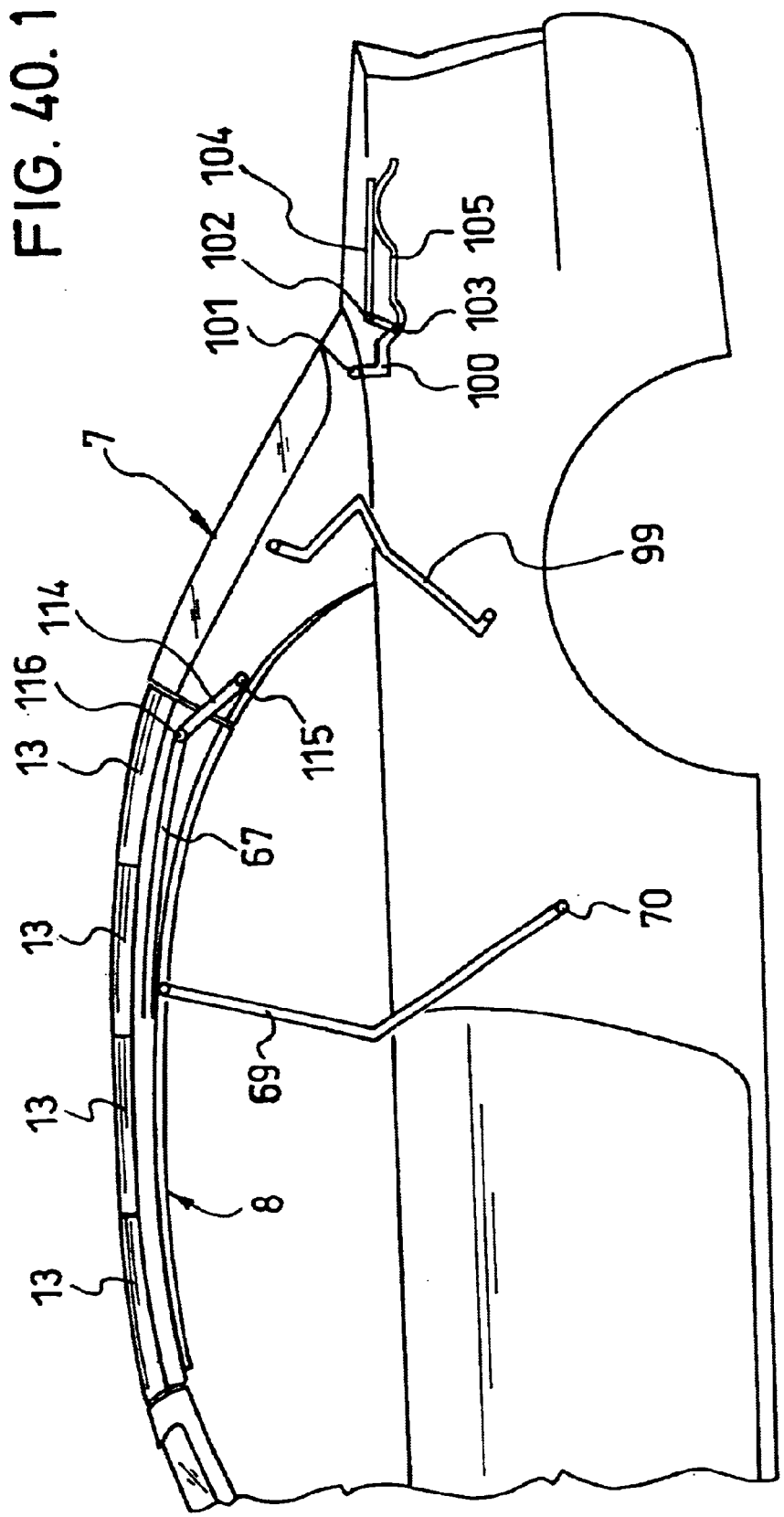

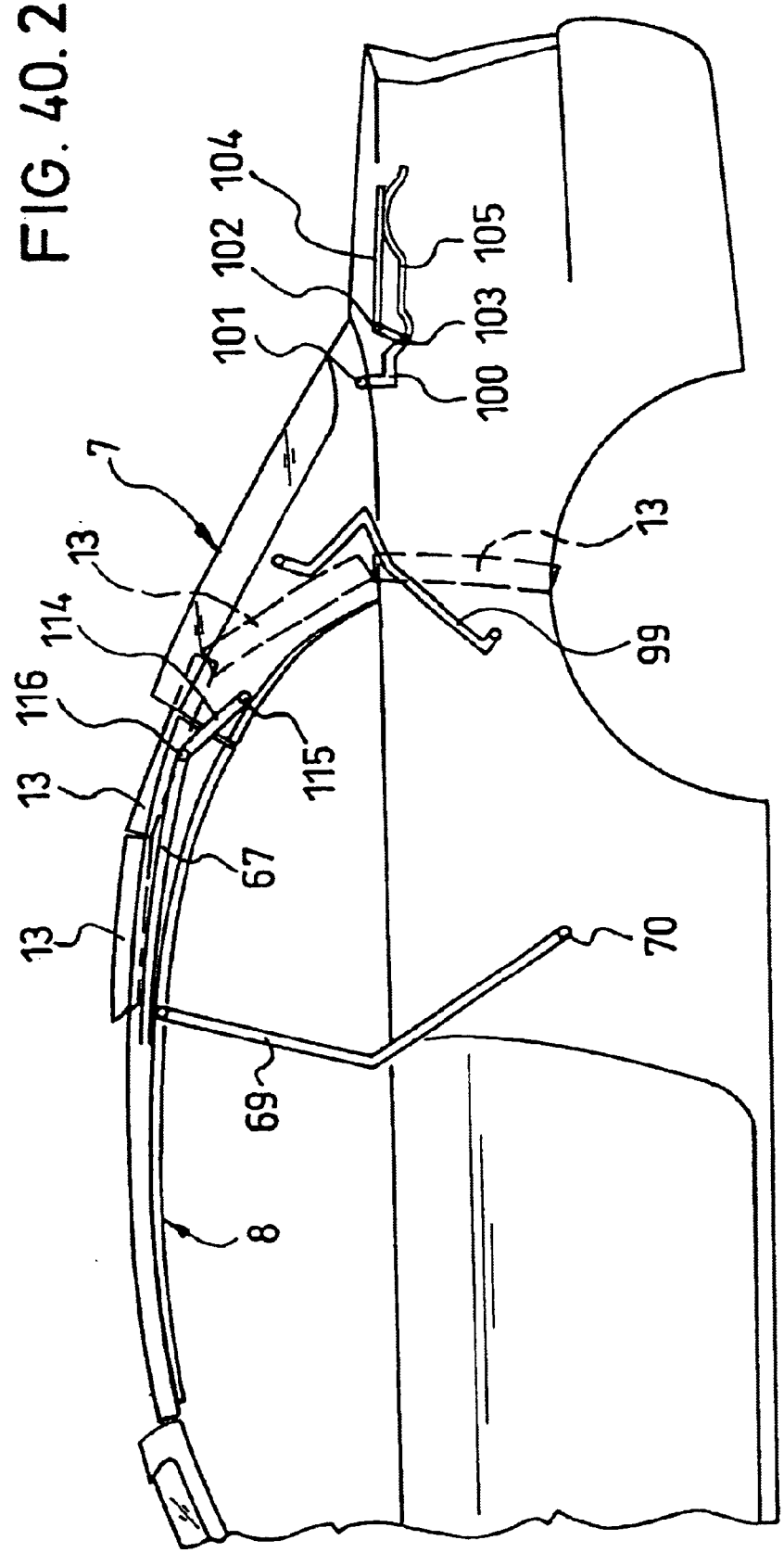

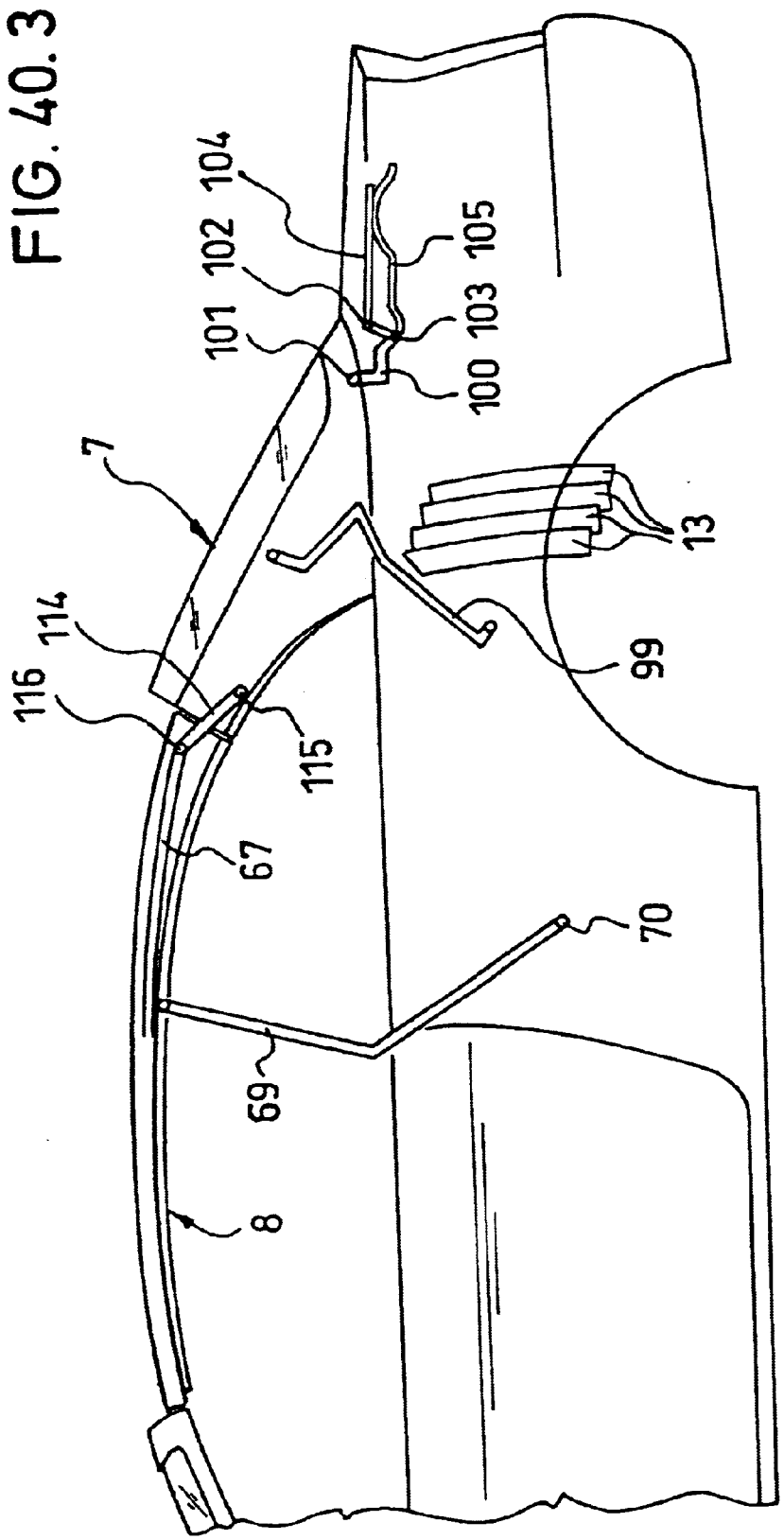

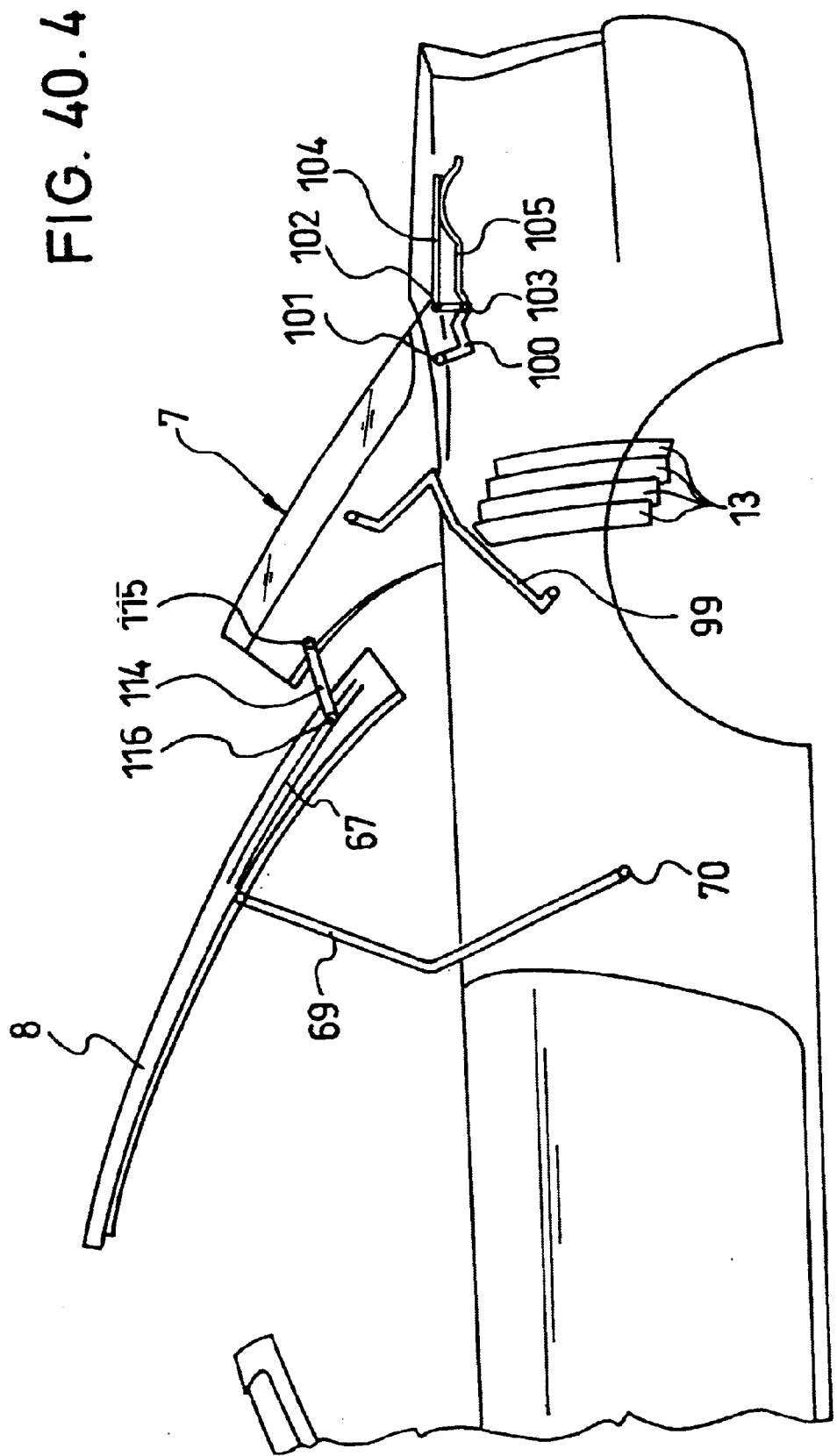

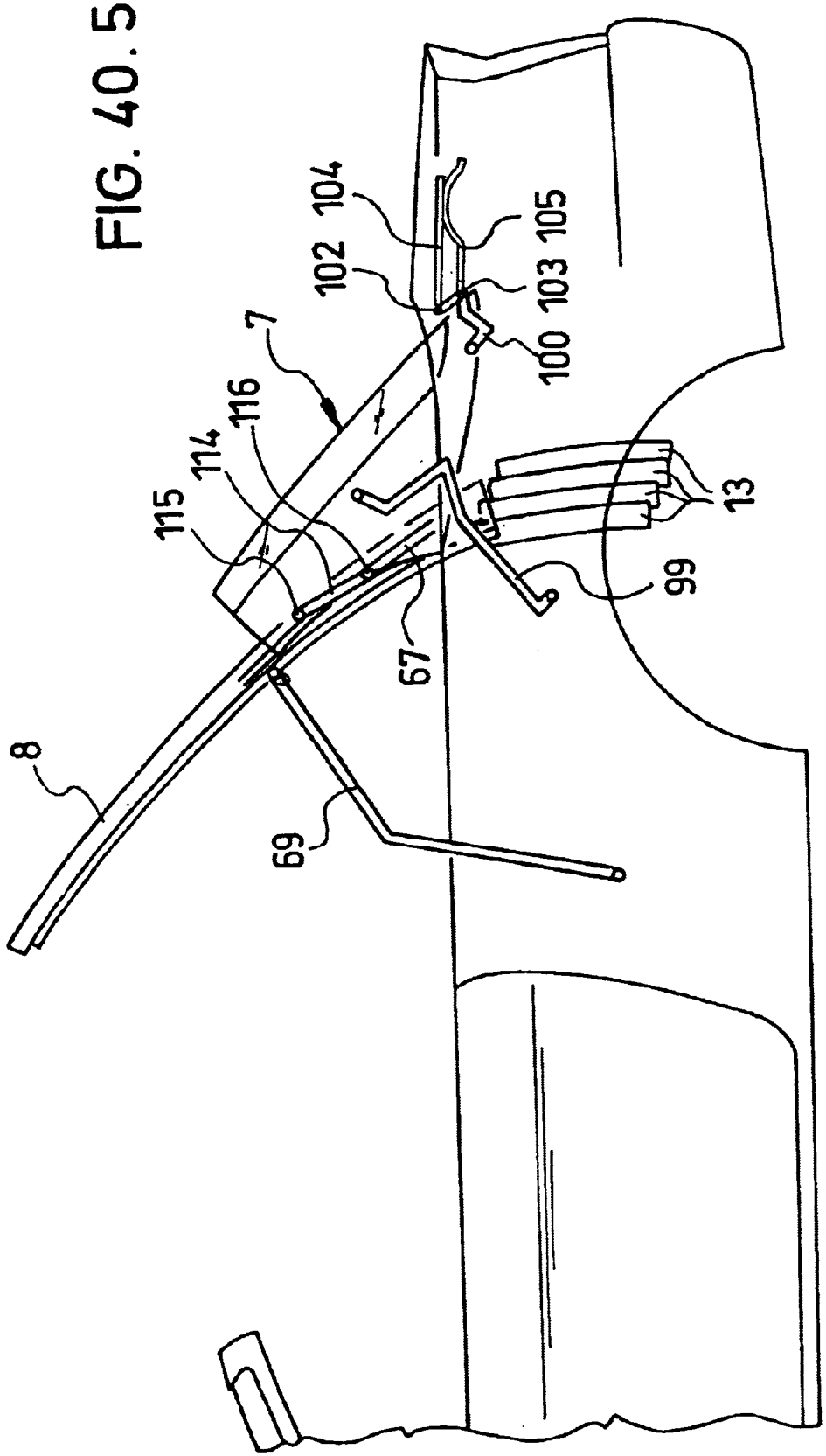

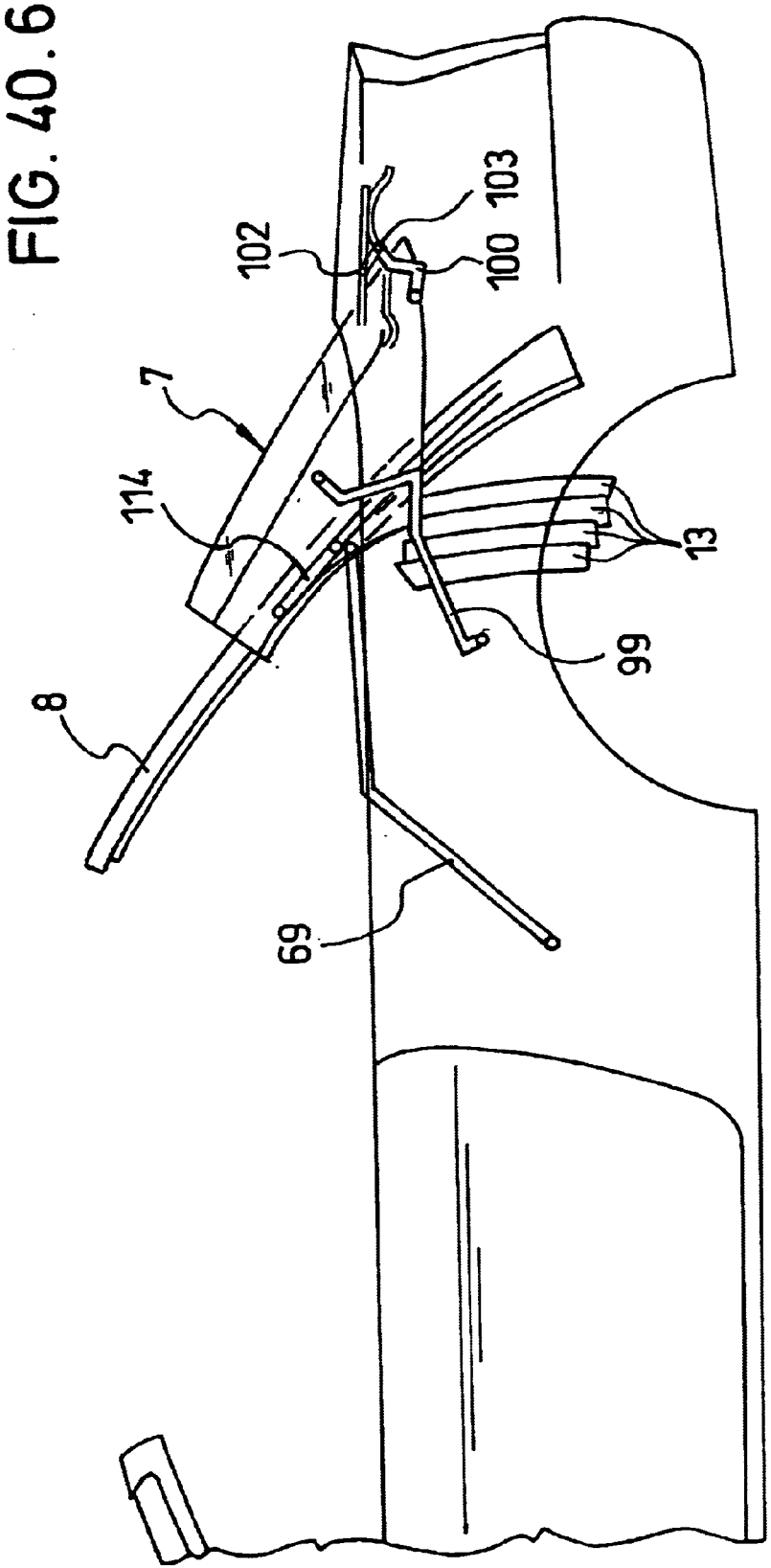
FIG. 40.6

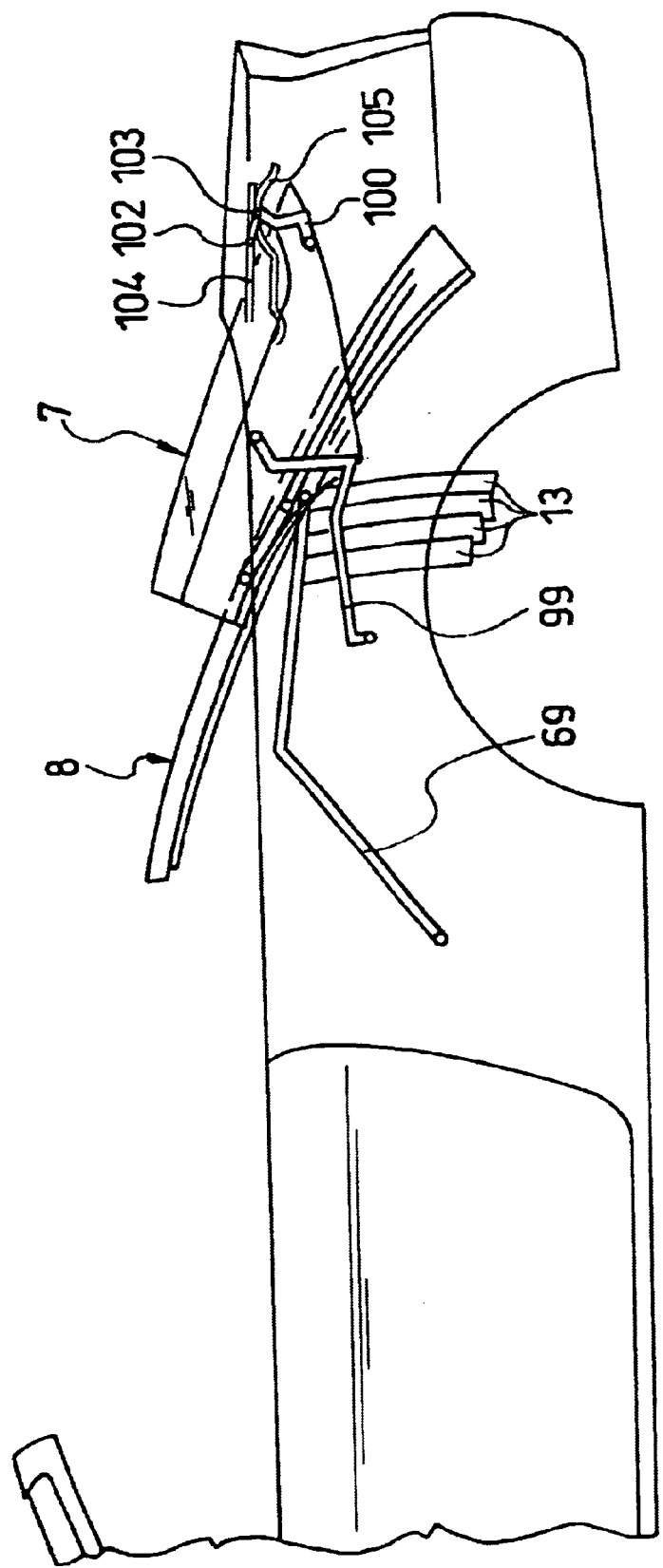
FIG. 40.7

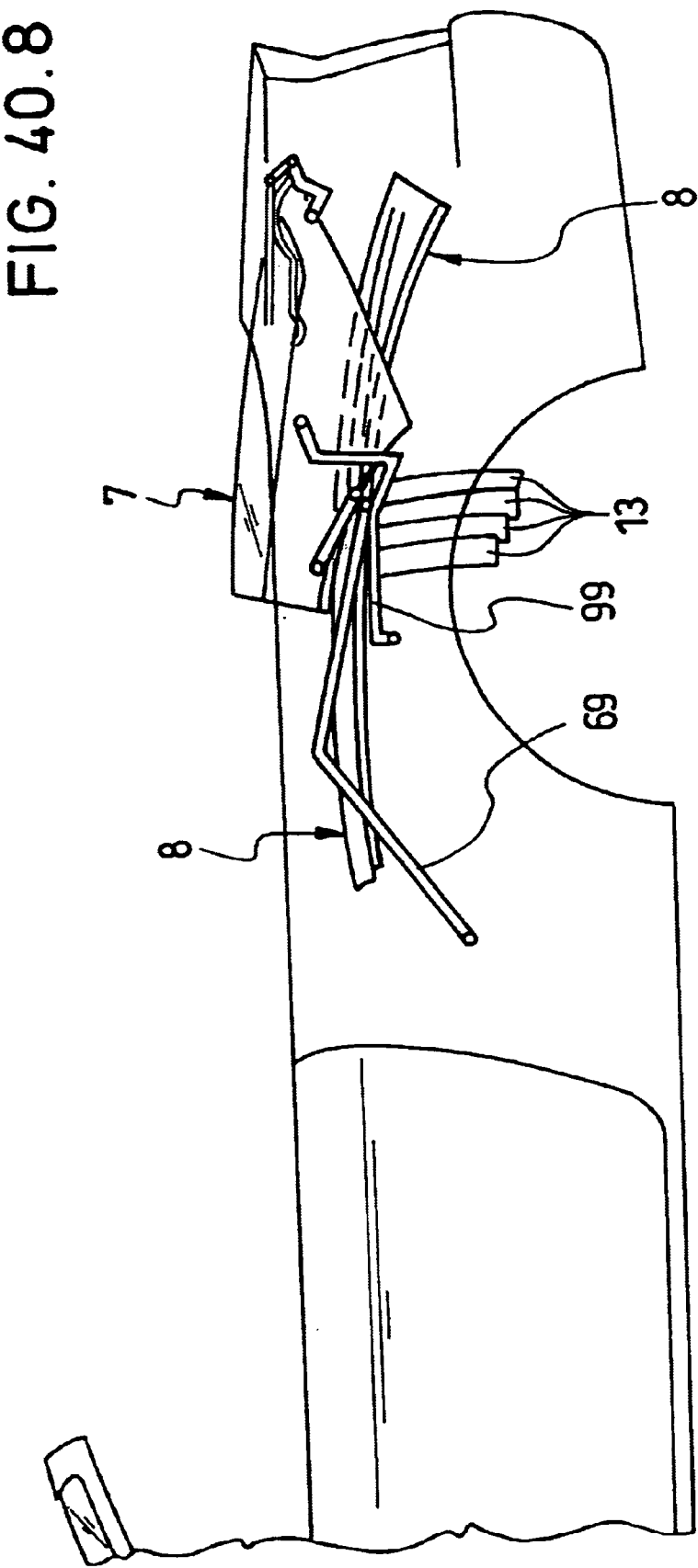
FIG. 40.8

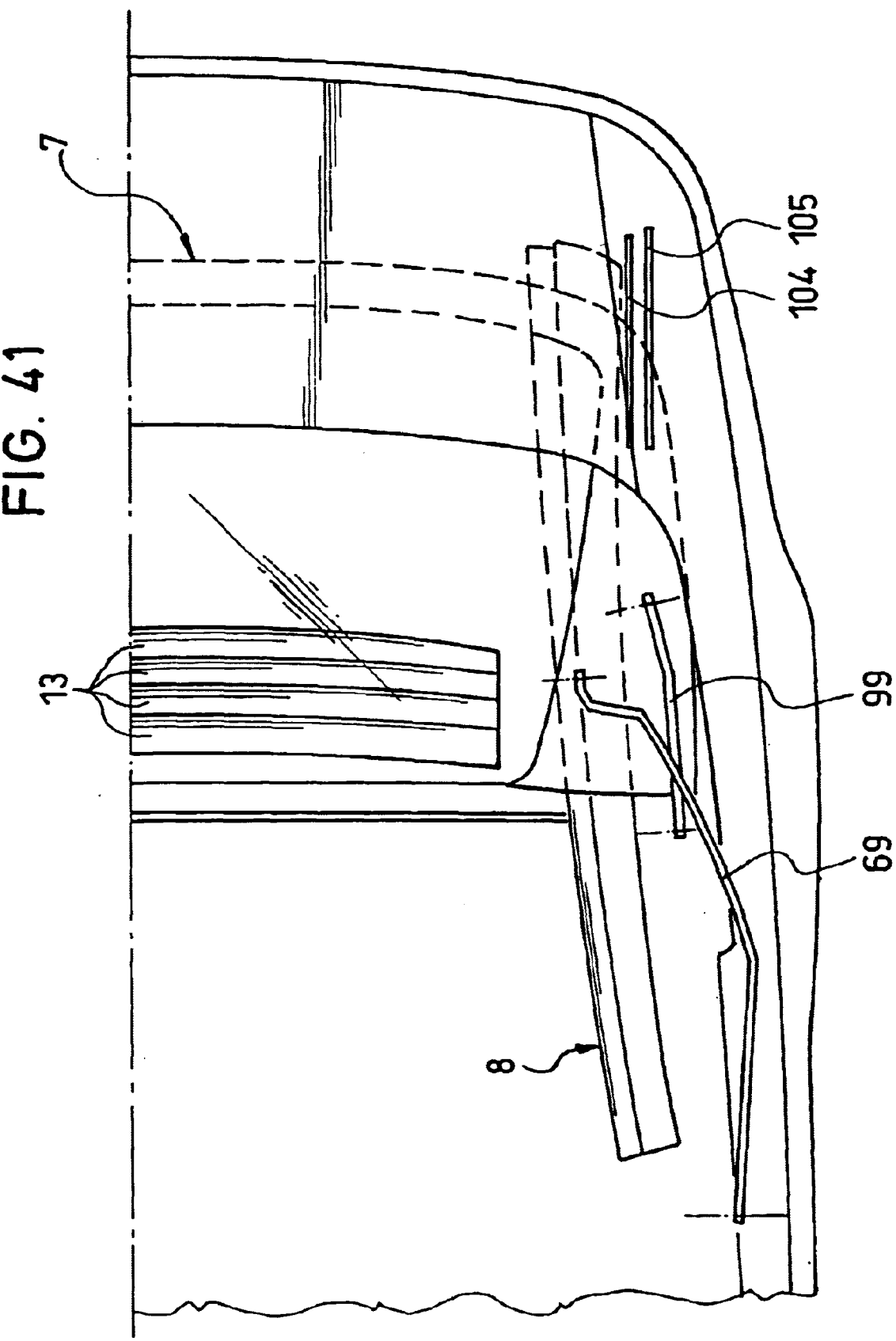

LOWERABLE MOTOR VEHICLE ROOF

SUMMARY OF THE INVENTION

1. Field of the Invention

The invention relates to a lowerable motor vehicle roof, especially of a hardtop convertible, with at least one openable front roof part which is movably supported lengthwise on the side roof members, and a rear roof part or rear element which can be moved into the storage position in the body.

2. Description of Related Art

Lowerable hardtop roofs generally comprise two or more roof parts which are permanently joined to one another and which are connected to one another via a linkage and can be moved by means of the latter into a storage space. For larger lowerable motor vehicle roofs, as for example motor vehicles with a rear bench seat have, these fixed roof parts require a large stowage or storage space, for example, in the trunk compartment. The retractable roof of the Mercedes SLK contains two roof parts which are hinged to one another and when lowered into the body are folded together around a transverse axis and are stored in the trunk compartment, requiring a large storage space.

SUMMARY OF THE INVENTION

A primary object of the present invention is to devise a motor vehicle roof of the initially mentioned type which can be lowered with an improved sequence of motion and which has a reduced requirement for storage space.

This object is achieved in a motor vehicle roof in accordance with the present invention in that at least the front roof part, when the roof is being lowered, is located first in a storage space in the body or on part of the roof, and the roof is then lowered into its storage position.

This object is furthermore achieved in the aforementioned motor vehicle roof also in that, according to the invention, each of the two side roof members is movably supported on the body and/or on the rear element and can be moved independently of the rear element or jointly with the rear element into the storage position.

Finally, this object is also achieved in the aforementioned motor vehicle roof in that, in accordance with the invention, the rear element is movably supported on the body and can be moved independently of the side roof members or jointly with the side roof members into the storage position.

When the roof part is formed by the louvered roof parts of a louvered roof, depending on the size of the motor vehicle roof, the louvered roof can be composed of several louvered roof parts which each have a shorter length in the lengthwise direction of the roof so that they can be stored in the storage space in a space-saving arrangement. Since the louvered roof parts are first located in the storage space before the roof is completely lowered, for example, the partially opened or completely stored louvered roof can clear a roof opening of varied size as the driving position.

In a motor vehicle roof according to the second and third above cited versions, it is advantageous if at least one front roof part is located first in the storage space in the body or on part of the roof when the roof is being lowered and then the roof is lowered into its storage position.

In general, it is advantageous if at least one roof part is pushed on guides and is lowered into the storage space in the body and the guides are located on the side roof member and/or on the rear element.

According to one advantageous version, it is provided that the storage space is located behind a bench seat, especially a rear bench seat, and the roof parts are located stacked therein roughly in a vertical alignment.

According to an alternative embodiment, it is provided that the storage space is located under the cover of a convertible top compartment or a hat rack and the roof parts are then located stacked therein especially roughly in a horizontal alignment.

According to another alternative embodiment, it is provided that the roof elements are located behind one another along a guide behind a bench seat, especially a rear bench seat, and/or under a trunk compartment.

According to a further alternative embodiment, it is provided that the roof parts are guided on the side roof member and are stacked thereon and can be lowered with the side roof member into the body.

According to an additional alternative embodiment, it is provided that the roof parts are stacked on the side roof member, moved under the rear element and especially folded and lowered with the rear element into the body.

According to yet another alternative embodiment, it is provided that the roof parts are pushed on guides into the rear element of the roof, stacked thereon and lowered with the rear element into the body.

According to one aspect of the invention which can be advantageously applied to the all versions noted above, it is provided that each side roof member can be moved by means of a lengthwise guide to under the rear element and can be lowered with the rear element into the body.

In doing so, the lengthwise guide advantageously has a slide rail which is located in the side roof member and/or in the rear element.

According to an alternative embodiment, it is provided that each side roof member can be moved along the lengthwise guide and lowered into the body.

In another advantageous embodiment, it is provided that each side roof member is supported by a rod means which is located in the closed state at the position of the B column and which is movably supported to lower the side roof member into the body on body-mounted guides, the side roof member being pivotally supported on the rod means. Here, it is especially advantageous if the side roof member is pivotally supported by means of a four-bar mechanism on the body, which mechanism preferably has two rods which, in the closed state of the roof, are located on the body essentially at the position of the B column so that they are covered by it and cannot occupy any viewing areas on the side windows.

According to an alternative embodiment, it is provided that the side roof member is pivotally supported by means of a four-bar mechanism on the rear element.

According to another alternative embodiment, it is provided that the rear element is movably supported by means of a four-bar mechanism on the body. Here, it is especially advantageous if the four-bar mechanism is designed such that the rear element is lowered by means of a dipping motion of its rear edge into the body.

The rear element is advantageously movably supported laterally on two guides with curved paths which fix the lowering motion of the rear element.

The rear element is preferably movably supported by means of a pivot rod and by means of a slide element which is guided in a guideway.

In all embodiments, as a result of the compact stowage possibilities, it is advantageous if the roof part or parts are the louvers of a louvered roof.

The motor vehicle roof in accordance with the invention is characterized by optimum design of the convertible top in the closed state, which enables large rear side windows and imparts a coupe character to the motor vehicle. It can be easily applied to four-seat motor vehicles. The opening process can take place without opening a trunk compartment flap or stowage space flap so that a special mechanism and a special drive are not necessary for this purpose.

The system of the invention can be designed without a cover of the convertible top compartment so that an optimum joint picture, i.e., a smooth transition surface, results, and a separate mechanism and a separate drive are not necessary for the cover of the convertible top compartment.

In the stored state, the motor vehicle roof has a compact package size, with a large trunk compartment, and last but not least, has good accessibility as a result of the large loading diagonal.

Finally, in contrast to the initially mentioned prior art, partial opening while driving is possible.

Embodiments of the motor vehicle roof are explained in detail below with reference to the accompanying drawings.

BRIEF DESCRIPTION OF THE DRAWINGS

FIGS. 1.1 to 1.3 are schematic side views of a convertible vehicle in accordance with a first embodiment of a lowerable roof according to the invention in different positions of motion as louvers of the roof are being stored;

FIGS. 3.1 to 9 show schematic side views of different embodiments of the storage positions for louvered roof parts of the motor vehicle roof;

FIGS. 10.1 to 20 show schematic side views of different embodiments of supports of a movable side roof member of the motor vehicle roof;

FIGS. 21.1 to 28 show schematic side views of different embodiments of supports of a movable rear element of the motor vehicle roof;

FIGS. 29.1 to 39.3 show schematic side views of different embodiments of the sequences of motion of the individual roof elements when the roof is being lowered;

FIGS. 40.1 to 40.8 are side views of a convertible vehicle with a lowerable roof which in different positions of motion as it is being lowered; and FIG. 41 is a plan view of the motor vehicle roof in the opened lowered position as shown in FIG. 40.8.

DETAILED DESCRIPTION OF THE INVENTION

Figure 2:
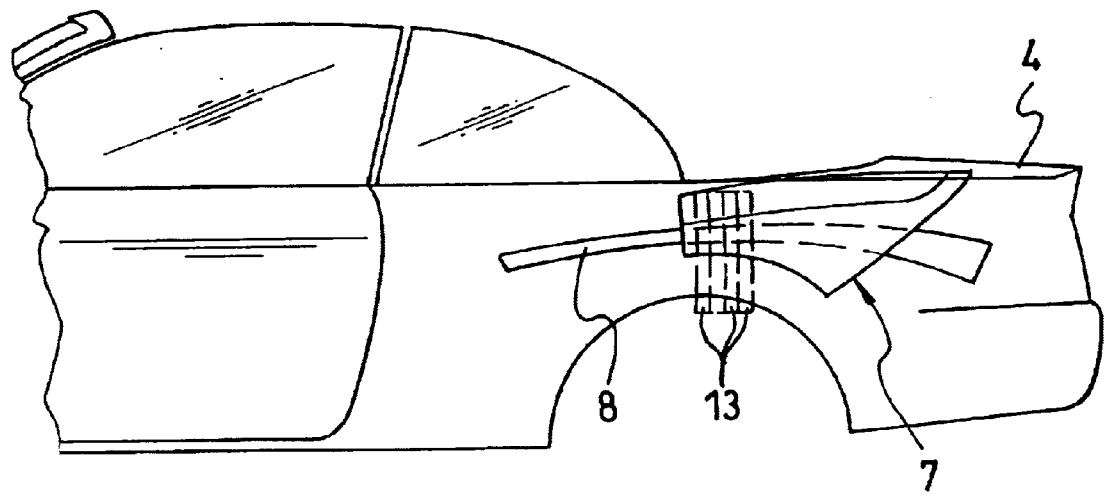
FIG. 2 is a view of the motor vehicle with the complete roof lowered and stowed.

A motor vehicle such as, for example, a four-seat convertible, contains a body 1 (see FIG. 1.1) with a rear fixed side part 2 which is located on each side of the vehicle, with a rear trunk compartment 3 and a cover 4 of the trunk compartment. A convertible, lowerable and retractable convertible roof 5 of the motor vehicle contains a rear element 7 which has a rear window 6, which is located in front of the trunk compartment cover 4 and which is movably supported on the body 1, and a side roof member 8 which is located on each side of the vehicle which, in the closed position of the roof 5 shown in FIG. 1.1, extends between the rear element 7 and the apron 9 on the top edge of the front window 10, and which forms a top, frame-like boundary for the front side window 11 and the rear side window 12. Between the two side roof members 8, there is a louvered roof with several movable louvered roof parts 13 which are formed as rigid elements, which are movably supported on the lengthwise guide 14 of the respective side roof member 8 and which are located behind one another in the closed position of the convertible roof 5.

When the convertible roof 5 is being converted and lowered or retracted into the storage position shown in FIG. 2 as an example, the louvered roof parts 13 are pushed by means of a drive in the body 1 along the lengthwise guide 14 and a guide 15 in the rear element into the stored position, and the rear element 7 and the side roof member 8 are stored in different ways according to the following embodiments. The rear side window 12 can be lowered in the conventional manner into the side part 2.

Since the motor vehicle and the convertible roof 5 are built largely symmetrically with respect to the vertical lengthwise center plane of the motor vehicle, the convertible roof 5 is described simply using the motor vehicle side or motor vehicle half shown at the time.

To open and convert the convertible roof 5 according to a first embodiment (see FIGS. 1.1 to 1.3), the louvered roof parts 13 are pushed by means of a drive on the lengthwise guide 14 of the side roof member 8, the guide 15 of the rear element 7 and a front and a rear storage guide 16, 17 into a storage space 18 under a hat rack or the cover of a convertible top compartment (see FIGS. 1.2 and 1.3) and are stored stacked on top of one another in a horizontal alignment in the storage space 18.

In the embodiment shown in FIGS. 3.1 to 3.3, the louvered roof parts 13 slide along the guides 14, 15 into the storage space 18 into which they are inserted in a horizontal alignment and are stored stacked on top of one another against the force of a spring 19. When the louvered roof parts 13 are being removed from the storage space 18, the front raised end 20 of the spring 19 presses the front ends of the louvered roof parts 13 into the guide rail 15.

In the embodiment shown in FIGS. 4.1 to 4.3, the louvered roof parts 13 slide along the guides 14, 15 into a storage space 21 behind a bench seat, especially a rear bench seat in a four-seat motor vehicle, in which they are accommodated stacked next to one another in a vertical arrangement. A vertical storage rail 22 guides the respective back or lower end of the louvered roof parts 13 down as far as a lower storage space rail 23. The louvered roof parts 13, in the storage space 19, are kept guided on the lower storage space rail 23 and an assigned upper storage space rail 24.

In the embodiment which is shown in FIGS. 5.1 to 5.3, the louvered roof parts 13 also slide along the guides 14, 15 into the storage space 21 in which they are accommodated stacked next to one another in a vertical arrangement. However, in this case, against the force of a spring 25.

In the embodiment which is shown in FIGS. 6.1 to 6.3, the louvered roof parts 13 slide along the guides 14, 15 into a storage space 26 in the rear element 7. The louvered roof parts 13 can be stacked under the rear window on two guide rails 27, 28 which can be folded out from the guide 15 into the operating position (compare FIGS. 6.2 & 6.3).

In the embodiment shown in FIGS. 7.1 to 7.3, the louvered roof parts 13 slide along the guides 14, 15 into the storage space 26 in the rear element 7. The storage space 29 is bounded by a lower holder or cover plate 30 which is removed via a scissors mechanism 31 from its neutral position 30 on the guide 15 (see FIG. 7.2), against the force of a tension spring 32, perpendicularly from the guide rail 15 in order to open the storage space 29 to the size necessary for accommodating the louvered roof parts 13.

Figure 8:
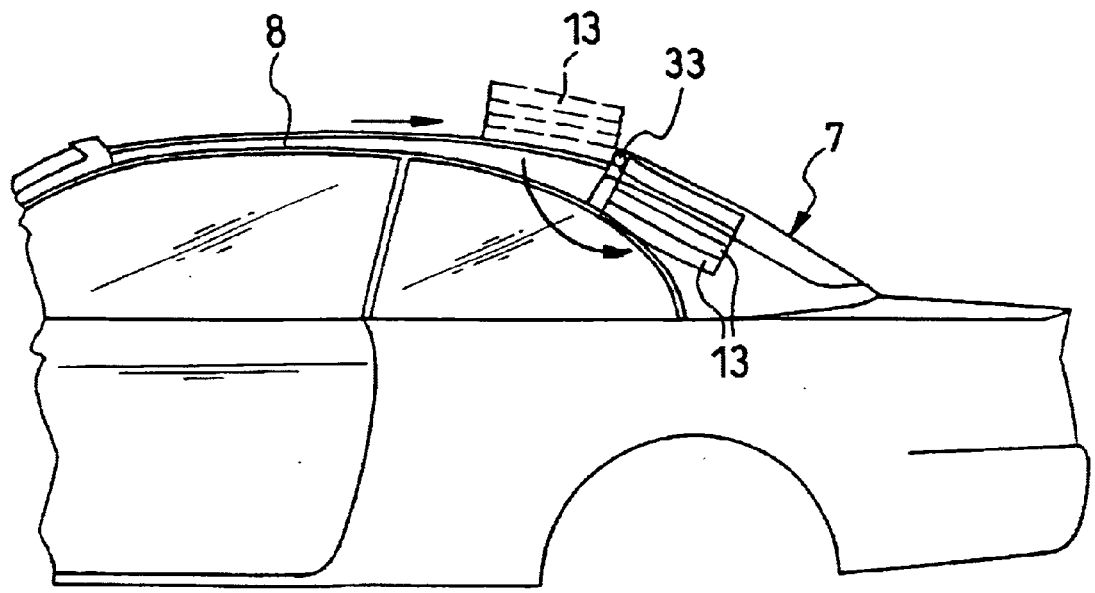

Another version for storing the louvered roof parts 13 is shown by FIG. 8. The louvered roof parts 13 are stacked on top of one another on the side roof member 8 at the position of the louvered roof part 13 which is last with the roof closed, and as a unit, is swung to under the rear element 7 around a hinge 33 which is located on the front edge of the rear element 7 or its rotary axis lies roughly in this position.

Figure 9:
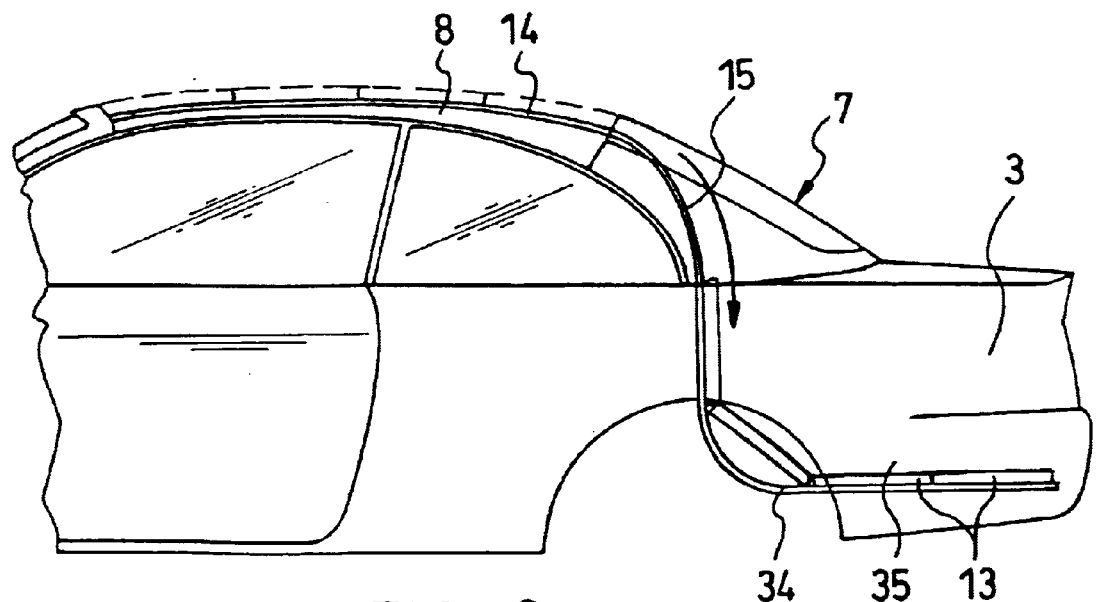

FIG. 9 shows an embodiment in which the louvered roof parts 13 are moved along the guides 14, 15 and a storage space rail 34 into a storage space 35 in which they retain their arrangement behind one another in the same order as when the convertible roof 5 closed. The storage space 35 has roughly an L shape, and thus, extends behind the rear bench seat and under the trunk compartment 3.

The side roof member 8 can be lowered in different ways, especially after lowering the louvered roof parts 13. According to the embodiment shown in FIGS. 10.1 & 10.2, the side roof member 8 contains a slide rail 36 into which the slide bearing unit 37 which is attached to the rear element 7 fits, and thus, movably supports the side roof members 8 on the rear element 7. From the position pushed to the rear (see FIG. 10.2), the rear element 7 can be moved with the side roof member 8 down into the stored position (as explained in detail below). In an embodiment which has been modified compared to the above described embodiment and which is shown in FIGS. 11.1 & 11.2, the rear element 7 contains a slide rail 38 on which the slide bearing unit 39 of the side roof member 8 is movably supported. The slide bearing units 38, 39 contain elongated bearing elements, or two bearing elements 40, 41 which are spaced apart from one another, for guiding the side roof member 8 on the respective slide rail 36, 38.

According to the embodiment shown in FIGS. 12.1 & 12.2, the side roof member 8 contains a slide bearing unit 39 which is movably supported in the slide rail 43. To lower the side roof member 8, the slide bearing unit 39 moves to the rear position on the slide rail 43 (see FIG. 12.2), the side roof member 8 assuming its lowered position by the tilt of its slide rail 43. Alternatively, a pivot mechanism can be provided on the slide bearing unit 39 which pivots the side roof member 8 relative to the slide rail 43.

According to the embodiment shown in FIGS. 13.1 & 13.2, the side roof member 8 is movably supported via a virtual B column which contains two rods 44, 45 which are pivotally supported on their top ends in the pivot joints 46 on the side roof member 8 and have slide elements 47 on their bottom ends, or are pivotally supported on slide elements which are movably supported in turn on two adjacent slide rails 48, 49. First of all, the slide elements 47 are pushed to the rear on a linear, slightly inclined section of the slide rails 48, 49, thereby moving the side roof member 8 to the rear by means of the rods 44, 45 which are located initially at the site of the conventional B column. On the rear downwardly curved section of the slide rails 48, 49 the rods 44 and 45 are swung down, while at the same time the side roof member 8 in the pivot joints 46 executes an opposite swinging motion and assumes an almost horizontal storage position (see FIG. 13.2).

According to the embodiment shown in FIGS. 14.1 & 14.2, the side roof member 8 is pivotally supported via a four-bar mechanism having a front rod 50 and a rear rod 51 connected to two joints 52, 53 which are located on the side part 2 roughly in the area of the rear element 7. The top joints 54, 55 of the rods 50, 51 are coupled to the back end of the side roof member 8.

According to the embodiment shown in FIGS. 15.1 & 15.2, the side roof member 8 is pivotally supported via a four-bar mechanism with a front rod 56 and a rear rod 57 on two joints 58, 59 which are located on the side part 2 in the vicinity of the front edge 60 of the side part 2. The top joints 61, 62 of the rods 56, 57 are coupled roughly in the middle of the side roof member 8 so that, in the closed position as shown in FIG. 15.1, the two angled rods 56, 57 are located at the position of the B column between the front window 11 and the rear window 12. In the lowered position as shown in FIG. 15.2, the rods 56, 57 extend roughly horizontally along the inner side of the side part 2.

Figure 16:
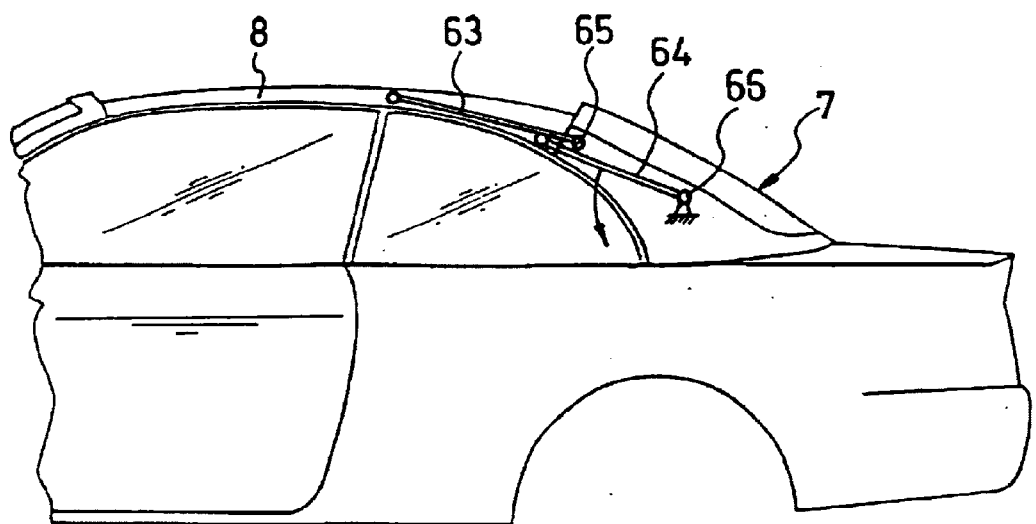

FIG. 16 shows an embodiment in which the side roof member 8 is pivotally supported by means of a four-bar mechanism with a first rod 63 and a second rod 64 in joints 65, 66 on the rear element 7. The side roof member 8 can be moved to under the rear element 7 and can be lowered with it into the stored position by a drive which acts, for example, on one of the two rods 63, 64.

Figure 17:
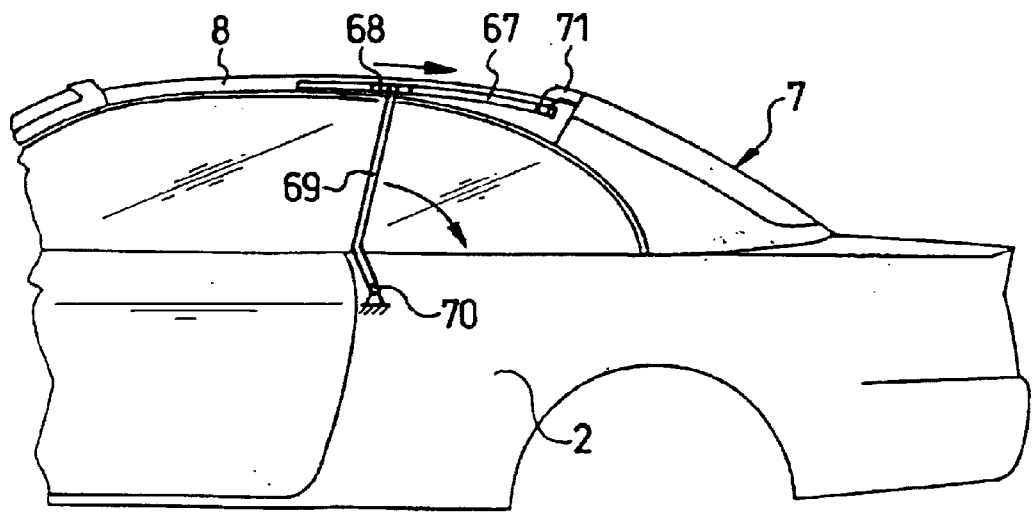

FIG. 17 shows an embodiment in which the side roof member 8 has a slide guide 67 in which the slide element 68 of the rod 69 is guided. The rod 69 is movably supported on its lower end in a pivot joint 70 on the side part 2. A bearing lever 71 which is located on the rear element 7 is movably guided in the slide guide 67 and guides the side roof member 8 to under the rear element 7. The rod 69 is swung down and entrains the side roof member 8 which can be additionally pushed down relative to the slide element 68. The slide element 68 can be pivoted relative to the rod 69 in order to allow compensation motion of the side roof member 8 relative to the rod 69.

Figure 18:
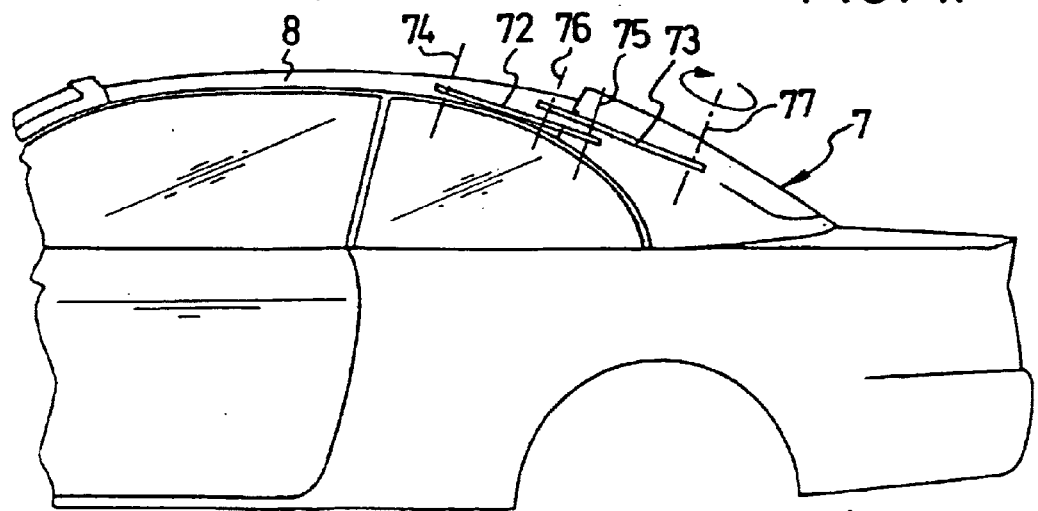

FIG. 18 shows an embodiment in which the side roof member 8 can be moved by means of a four-bar mechanism which is supported on the rear element 7. The two hinged rods 72, 73 pivot around the axes 74 and 75, and 76 and 77, respectively, which are rearwardly inclined relative to vertical.

Figure 19:
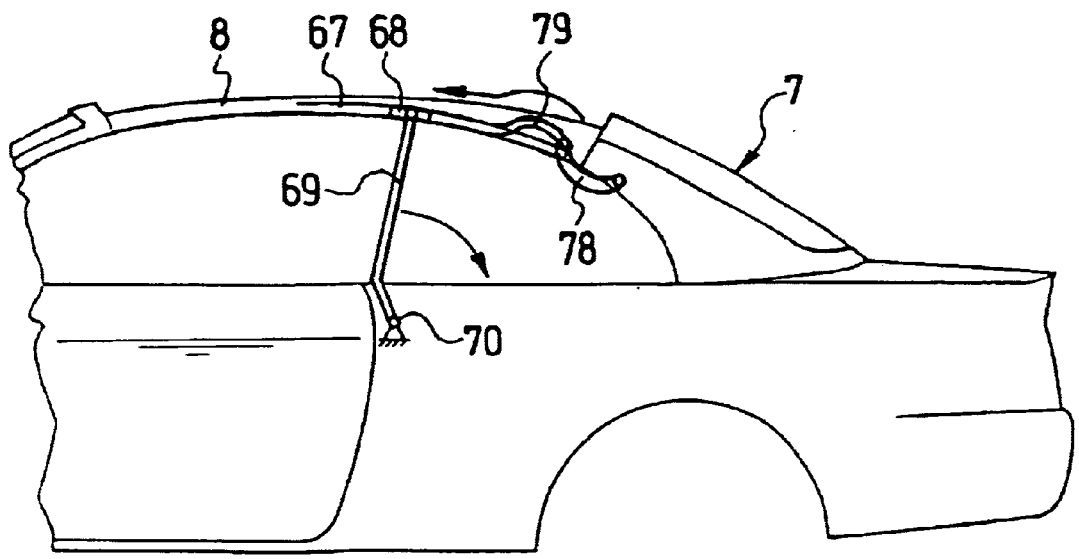

FIG. 19 shows an embodiment which is similar to the embodiment as shown in FIG. 17 and in which the side roof member 8 likewise has a slide guide 67 in which the slide element 68 of the rod 69 is guided which in turn is movably supported on its back end in the swivel joint 70 on the side part 2. A bearing lever 78 which is pivotally located on the rear element 7 movably fits into a curve-shaped guideway 79 on the back end of the side roof member 8 and into the slide guide 67. To move the side roof member 8 to under the rear element 7 the rod 69 is swung to the rear and in doing so entrains the side roof member 8 which is swung relative to the rod 69. In doing so the bearing lever 78 is swung down and guides the back end of the side roof member 8 likewise down, and the rear element 7.

Figure 20:
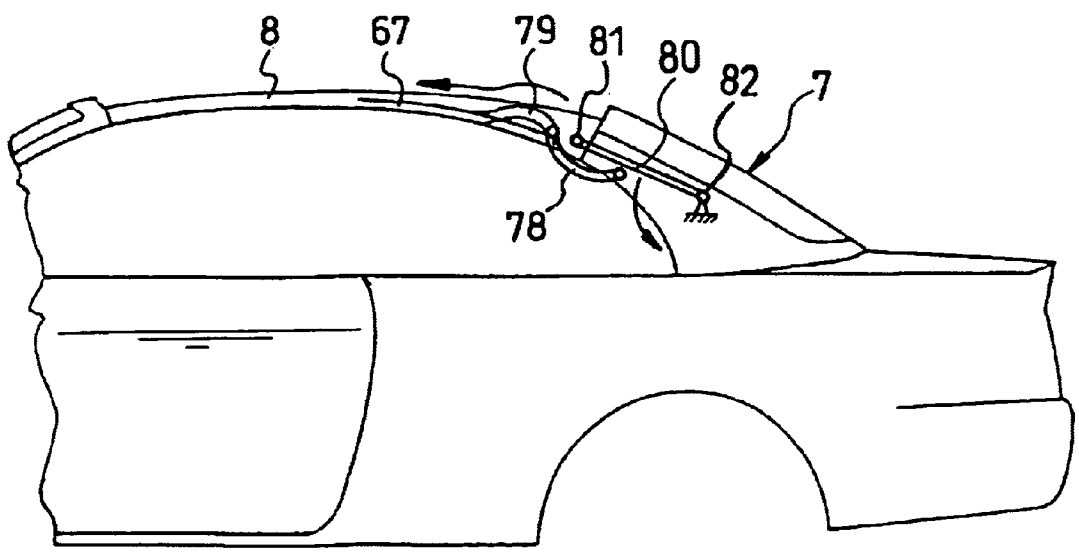

In the embodiment shown in FIG. 20, compared to the embodiment shown in FIG. 19, the rod 69 is replaced by a rod 80 which is pivotally supported in the joints 81, 82 on the side roof member 8 and on the rear element 7 and is swung down to store the side roof member 8.

Lowering the rear element 7 into its stored position takes place in the embodiment shown in FIGS. 21.1 & 21.2 by means of a four-bar mechanism with a first and a second rod 83, 84 which are pivotally supported on the rear element 7 in the joints 85, 86 and on the side part 2 in the joints 87, 88. By driving the rods 83, 84 to pivot clockwise, the rear element 7 executes a "turn-out" motion in which it is initially raised and then is swung down into its stored position. If it should be necessary for reasons of space, the cover 4 of the trunk compartment can be briefly raised at its front edge so that the rear element 7 can be moved under it.

In the embodiment shown in FIGS. 22.1 & 22.2, a four-bar mechanism with the first and the second rods 83, 84 which are pivotally supported on the rear element 7 in the joints 85, 86 and on the side part 2 in the joints 87, 88 is arranged such that pivoting motion of the rods 83, 84 counterclockwise transfers the rear element 7, in what can be called a "turning-in" a motion, initially lowers the rear element 7 and then swings it down into its stored position. The cover 4 of the trunk compartment need not be raised.

In the embodiment shown in FIGS. 23.1 & 23.2, a front and a rear curved-shaped slide rail 89, 90, which are attached on the side part 2, are attached by two pivot bearings 91, 92 to the rear element 7. By pushing at least one of the swivel bearings or the rear element 7, it is transferred into its stored position.

Figure 24:
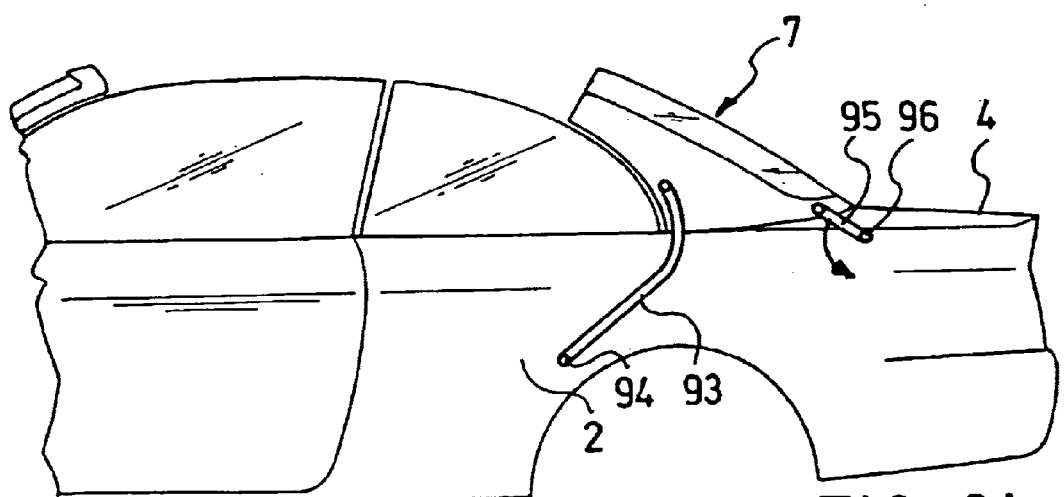

FIG. 24 shows an embodiment with an alternatively arranged four-bar mechanism with a front rod 93 which has a pivot bearing 94 which is located comparatively far forward on the side part 2. The rear short rod 95, when it is driven counterclockwise and when the rear element 7 is being lowered, guides the latter on a short swinging path around the joint 96 to under the cover 4 of the trunk compartment.

Figure 25:
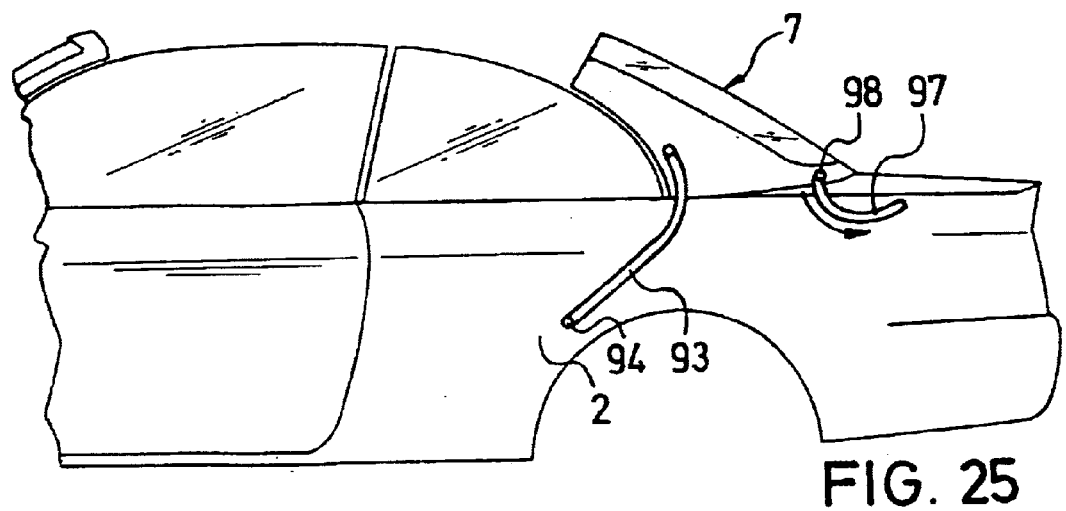

In the embodiment shown in FIG. 25, the rear rod 95 is replaced by a slide rail 97 which movably holds the bearing element 98 which is supported on the rear element 7. This bearing element 98 is driven for lowering the rear element 7, while the front rod 93 swings according to the motion of the rear element 7.

Figure 26:
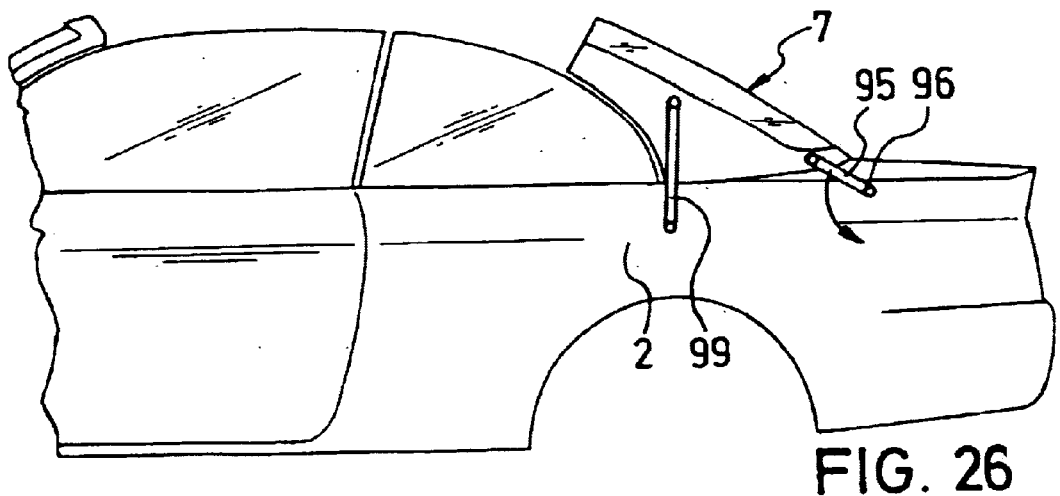

The embodiment shown in FIG. 26 differs from that of FIG. 24 by an alternative arrangement of the front rod 99, yielding modified dynamic behavior.

Figure 27:
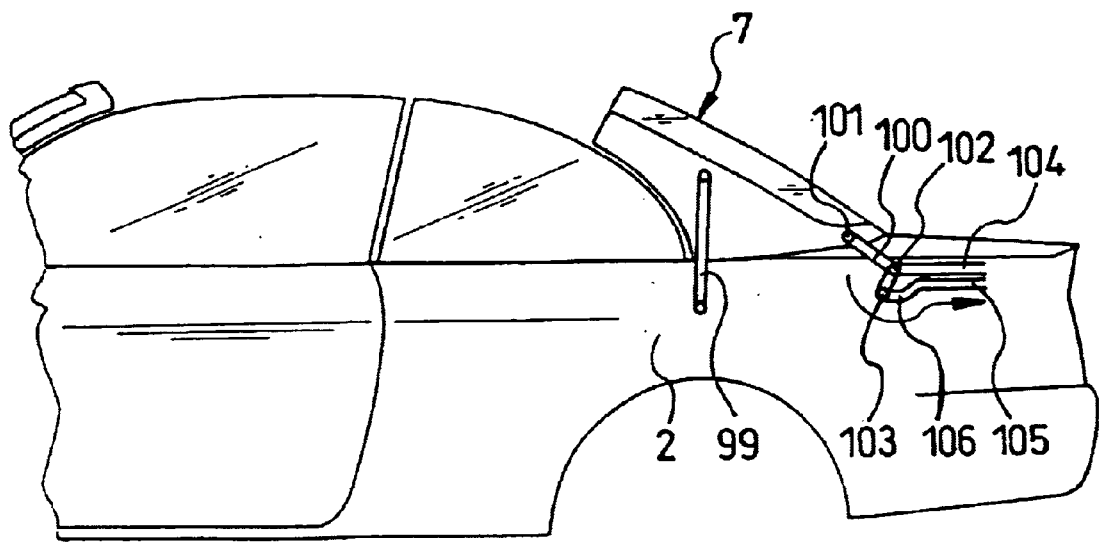

The embodiment of FIG. 27 contains not only the front rod 99, but also a bearing lever 100 which, on the one hand, is pivotally attached in a joint 101 to the rear element 7, and on the other hand, is movably held by a respective slide element 102, 103 in a linear guide 104 or a guide 105 with an initial curve section 106. When the bearing lever 100 is pushed on its guides in the direction toward the motor vehicle rear, initially the slide element 103 slides on the curve section 106 before the slide element 102 is pushed. In this way, the bearing lever 100 with its joint 101 is swung down so that the rear element 7 executes a dipping motion on its back end.

Figure 28:
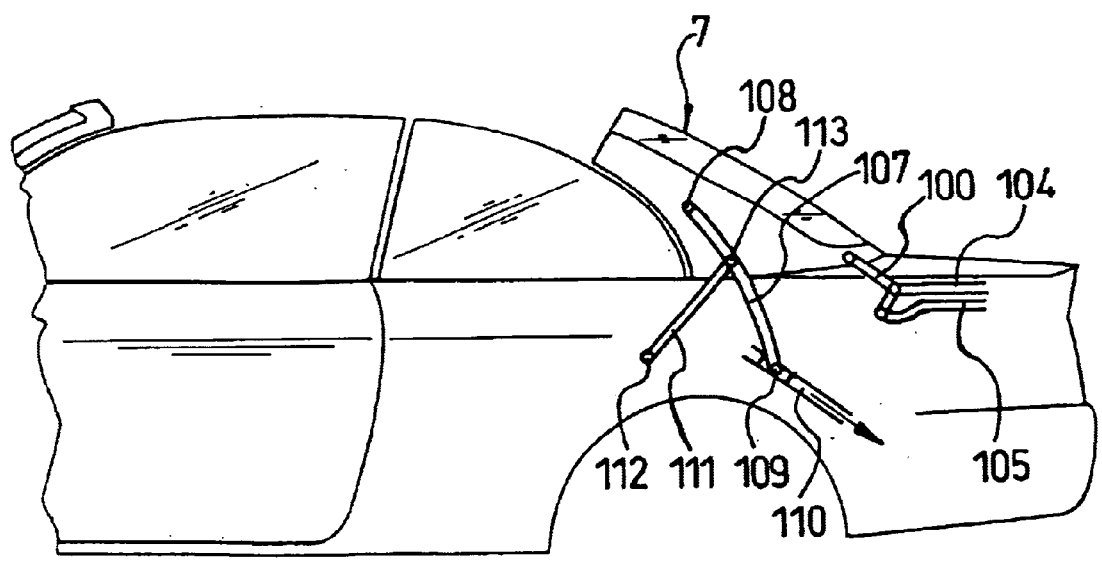

The embodiment shown in FIG. 28 contains the bearing lever 100 which is described in the preceding embodiment with its bearing means for the back end of the rear element 7. The front support of the rear element 7 is formed by a rod 107 which is pivotally supported in the joint 108 on the rear element 7 and is pivotally supported on a bearing part 109 which is movably supported on a body-mounted, lengthwise guide 110. The rod 107 is supported by a support lever 11 which is supported, on the one hand, on a body-mounted joint 112, and on the other hand, at a joint 113 on the rod 107.

Different sequences of motion for converting and storing the above described convertible roofs are described below.

According to a first motion sequence (see FIGS. 29.1 to 29.3), first the louvered roof parts 13 are pushed into the storage space 18, then the side roof member 8 is lowered into the body and finally the rear element 7 is lowered. The individual sequences of motion can proceed partially or entirely superimposed in this example as well as in the following examples.

In a second sequence of motions (see FIGS. 30.1 to 30.3), the louvered roof parts 13 are pushed into the storage space 18, then the side roof member 8 is moved to under the rear element 7 and lowered with it.

In the third sequence of motions (see FIGS. 31.1 to 31.3), the louvered roof parts 13 are pushed into the rear element 7 and are arranged stacked in the storage space which is provided on it. Then, the side roof member 8 and the rear element 7 are lowered.

In the fourth sequence of motions (see FIGS. 32.1 to 32.3), the louvered roof parts 13 are pushed into the rear element 7 and are arranged stacked in the storage space which is provided on it. Furthermore, the side roof member 8 is moved into the rear element 7 and the unit comprised of the rear element 7 with the louvered roof parts 13 and the side roof member 8 is lowered.

In the fifth sequence of motions (see FIGS. 33.1. to 33.3), first the rear element 7 is moved into its stored position in the trunk compartment 3. Then, the louvered roof parts 13 are moved along their guides into their storage space. Finally, the side roof member 8 is lowered by means of a four-bar mechanism into the body. If it should be necessary, the cover 4 of the trunk compartment is swung up at its front edge which faces the convertible roof (FIG. 33.2). In doing so, the rear element 7 can be located on the cover 4 of the trunk compartment and can be swung along with it.

In the sixth sequence of motions (see FIGS. 34.1 to 34.3), first the louvered roof parts 13 are pushed into the storage space 18, then the rear element 7 is lowered, and finally the side roof member 8 is lowered into the body. If it should be necessary, the cover 4 of the trunk compartment is swung up at its front edge which faces the convertible roof (FIG. 34.3).

In the seventh sequence of motions (see FIGS. 35.1 to 35.3), first the louvered roof parts 13 are pushed into the storage space 18, then the rear element 7 is moved onto the side roof members 8 and then the side roof members 8 are lowered with the rear element 7 into the body.

In the eighth sequence of motions (see FIGS. 36.1 to 36.3), first the louvered roof parts 13 are stacked on the side roof member 8 and moved with the side roof member 8 into the body. Then, the rear element 7 is moved into its stored position in the body.

In the ninth sequence of motions (see FIGS. 37.1 to 37.3), likewise, first the louvered roof parts 13 are stacked on the side roof member 8. Then, the rear element 7 is moved onto the side roof member 8 and then the side roof member 8 with the stacked louvered roof parts 13 and with the rear element 7 is lowered into the body.

In the tenth sequence of motions (see FIGS. 38.1 to 38.3), likewise, first the louvered roof parts 13 are stacked on the side roof member 8. Then, the side roof members 8 with the louvered roof parts 13 are moved to under the rear element 7. Finally, the rear element 7 with the side roof members 8 and the louvered roof parts 13 are lowered into the body.

In the eleventh sequence of motions (see FIGS. 39.1 to 39.3), likewise, first the louvered roof parts 13 are pushed along their guides to under the rear element 7 and stacked there, then the rear element 7 is moved onto the side roof members 8 and the side roof members 8 are lowered into the body together with the rear element 7 and the louvered roof parts 13.

These sequences of motion can be used or carried out in the various embodiments of the convertible roofs to move the individual components, as well as by different combinations of the described kinematic elements.

Another embodiment of a convertible roof is shown in FIGS. 40.1 to 40.6. Each side roof member 8 is pivotally supported via the rod 69 and the body-mounted joint 70 on the body, the rod 69, in the closed position of the roof, assuming roughly the position of the B column. Four louvered roof parts 13 are movably supported on the side roof members 8. The back end of each side roof member 8 is pivotally joined on the rear element 7 by means of a lever 114 which is pivotally supported on both ends. The rear element 7 is movably supported by the rod 99 and by a guide means according to the embodiment shown in FIG. 27. FIG. 40.2 shows the downward displacement of the louvered roof parts 13 into the storage space (FIG. 40.3).

To lower the side roof members 8, the rod 69 is swung to the rear (FIG. 40.4). At the same time, the lever 114 swings down around its joint 115 on the rear element 7 and thus lowers the back end of the respective side roof member 8 to under the rear element 7. The bearing lever 100 is moved to the rear on its guides 104, 105, and in doing so, swings down so that the back end of the rear element 7 is lowered. As the rod 69 continues to pivot (see FIG. 40.5), the side roof member 8 is lowered under the rear element 7, the pivot joint 116 of the lever 114 being pushed on the lengthwise guide 67 of the side roof member 8. The rear element 7 is lowered by the displacement of the bearing lever 100 pointed to the rear together with the pivoting of the rod 99.

The convertible roof reaches it position stored in the body as shown in FIG. 40.8 via the intermediate positions of the sequence of motions as shown in FIGS. 40.6 and 40.7. FIG. 41 shows the convertible roof in its converted open position of FIG. 40.8 in an overhead view.

The drive motion for the elements to be driven can take place by means of electrical or hydraulic drive motors or combinations thereof, sheathed cables or lever means transferring the drive motion and the drive force to the elements. There can likewise be manual activation of individual or several elements.

What is claimed is:

1. Lowerable motor vehicle roof, comprising side roof members, at least one openable front roof part movably supported for movement lengthwise on the side roof members, and a rear roof part which is mounted in a manner enabling movement thereof into a storage space located behind a passenger space in a vehicle body, wherein each side roof member is movably supported on at least one of the vehicle body and on the rear roof part and is movable into the storage space by a pivotable linkage arrangement which is adapted to swing said side members rearwardly into said storage space, and wherein said rear roof part is displaceable into a position in said storage space in which the rear roof part lies over said side members.

2. Lowerable motor vehicle roof according to claim 1, wherein the side members are movable into the storage space with the rear roof member.

3. Lowerable motor vehicle roof according to claim 1, wherein the side members are movable into the storage space independently of the rear roof member.

4. Lowerable motor vehicle roof according to claim 1, wherein the at least one openable front roof part is lowerable into the storage space as a unit with the rear roof part.

5. Lowerable motor vehicle roof, comprising side roof members, at least one openable front roof part movably supported for movement lengthwise on the side roof members, and a rear roof part which is movably supported on the vehicle body in a manner enabling movement of the rear roof part from a raised position into a storage space in a vehicle body; wherein a transfer mechanism is provided by which the at least one openable front roof part is transferable from said side roof members into a storage position within said storage space with the rear roof part in its raised position; and wherein a pivotable linkage arrangement is provided for swinging said side members rearwardly into said storage space after said at least one openable front roof part has been transferred into the storage position.

6. Lowerable motor vehicle roof according to claim 5, wherein the rear roof member is movable into the storage space with the side members.

7. Lowerable motor vehicle roof according to claim 5, wherein the rear roof part is movable into the storage space independently of the side roof members.

8. Lowerable motor vehicle roof according to claim 5, wherein the at least one openable front roof part is lowerable into the storage space as a unit with the rear roof part.

9. Motor vehicle roof as claimed in claim 5, wherein the at least one openable front roof part is movable on guides so as to be lowerable into the storage space in the vehicle body, the guides being located on at least one of the rear roof part and the side roof members.

10. Motor vehicle roof as claimed in claim 5, wherein the storage space is located behind a bench seat, and the at least one roof part comprises a plurality of roof parts which are locatable stacked roughly in a vertical alignment within the storage space.

11. Motor vehicle roof as claimed in claim 5, wherein the storage space is located under one of a cover of a convertible top compartment and a hat rack, and the at least one roof part comprises a plurality of roof parts which are locatable stacked roughly in a horizontal alignment within the storage space.

12. Motor vehicle roof as claimed in claim 5, wherein the at least one roof part comprises a plurality of roof elements which are located one behind another along a guide in said storage space, said storage space being located in at least one of a location behind a bench seat and under a trunk compartment.

13. Motor vehicle roof as claimed in claim 5, wherein the at least one front roof part comprises a plurality of roof elements which are movable on guides into the rear roof part and are stackable therein for lowering with the rear roof part into the vehicle body.

14. Motor vehicle roof as claimed in claim 5, wherein said pivotable linkage arrangement comprises a pair of four-bar mechanisms; and wherein each side roof member is pivotally supported on the vehicle body by a respective one of the four-bar mechanisms.

15. Motor vehicle roof as claimed in claim 14, wherein the four-bar mechanism comprises two rods which, in a closed state of the roof, are located on the vehicle body essentially at a position of a B column.

16. Motor vehicle roof as claimed in claim 3, wherein each side roof member is pivotally supported by means of a four-bar mechanism on the rear roof part.

17. Motor vehicle roof as claimed in claim 5, wherein the roof part is movably supported on the vehicle body by a four-bar mechanism.

18. Motor vehicle roof as claimed in claim 17, wherein the four-bar mechanism adapted to lower the rear roof part with a dipping motion of a rear edge of the rear roof part into the body.

19. Motor vehicle roof as claimed in claim 5, wherein the rear roof part is movably supported laterally on two guides with curved paths which fix a lowering motion of the rear roof part, one of said two guides being provided at each lateral side of the roof part.

20. Motor vehicle roof as claimed in claim 5, wherein the rear roof part is movably supported by a pivot rod and by a slide element which is guided in a guideway.

21. Motor vehicle roof as claimed in claim 5, wherein the at least one front roof part comprises louvers of a louvered roof.

\* \* \* \* \*